US012283980B2

(12) United States Patent
Moses et al.

(10) Patent No.: US 12,283,980 B2
(45) Date of Patent: Apr. 22, 2025

(54) PRECODING FOR NON-LINEARITY CORRECTION

(71) Applicant: QUALCOMM Incorporated, San Diego, CA (US)

(72) Inventors: Amit Moses, Tel Aviv (IL); Gideon Shlomo Kutz, Ramat Hasharon (IL); Aviv Regev, Tel Aviv (IL); Ronen Shaked, Kfar Saba (IL); Yaniv Eistein, Tel Aviv (IL)

(73) Assignee: QUALCOMM Incorporated, San Diego, CA (US)

( * ) Notice: Subject to any disclaimer, the term of this patent is extended or adjusted under 35 U.S.C. 154(b) by 40 days.

(21) Appl. No.: 18/309,377

(22) Filed: Apr. 28, 2023

(65) Prior Publication Data

US 2024/0364373 A1 Oct. 31, 2024

(51) Int. Cl.
*H04L 25/49* (2006.01)
*H04B 1/04* (2006.01)

(52) U.S. Cl.
CPC ... *H04B 1/0475* (2013.01); *H04B 2001/0425* (2013.01)

(58) Field of Classification Search
CPC ... H04L 5/006; H04L 5/0051; H04L 25/0226; H04W 72/23; H04W 8/24; H04W 52/365; H04W 48/20; H04B 1/0475; H04B 1/109; H04B 1/123; H04B 7/0617
USPC ........................................................ 275/297
See application file for complete search history.

(56) References Cited

U.S. PATENT DOCUMENTS

| | | | | |
|---|---|---|---|---|
| 8,923,787 B2 * | 12/2014 | Laporte | ................ | H03F 1/3247 |
| | | | | 375/296 |
| 2019/0190552 A1 | 6/2019 | Sagi et al. | | |
| 2021/0376890 A1 | 12/2021 | Levy et al. | | |
| 2022/0217017 A1 | 7/2022 | Zach et al. | | |
| 2022/0312244 A1 * | 9/2022 | Landis | ................ | H04B 7/0465 |
| 2023/0361794 A1 * | 11/2023 | Uziel | ................ | H04W 72/11 |
| 2023/0388815 A1 * | 11/2023 | Jeon | ................ | H04B 17/336 |
| 2024/0118082 A1 * | 4/2024 | Joet | ................ | G01C 19/5733 |

OTHER PUBLICATIONS

International Search Report and Written Opinion—PCT/US2024/022609—ISA/EPO—Jul. 8, 2024.

* cited by examiner

*Primary Examiner* — Khai Tran
(74) *Attorney, Agent, or Firm* — Kevin M. Donnelly; Harrity & Harrity, LLP

(57) ABSTRACT

Various aspects of the present disclosure generally relate to wireless communication. In some aspects, a network node may precode communications with a precoding configured to improve non-linearity (NL). Some aspects more specifically relate to a user equipment (UE) obtaining power amplifier (PA) NL coefficients associated with NL of PAs of a network node. The UE may transmit an indication of the PA NL coefficients to the network node, which may use the indication to select precoding configured to improve reception of communications transmitted with PA NL or to improve decoding of communications transmitted using the precoding.

30 Claims, 9 Drawing Sheets

PRECODING FOR NON-LINEARITY CORRECTION

FIELD OF THE DISCLOSURE

Aspects of the present disclosure generally relate to wireless communication and specifically, to techniques and apparatuses for precoding for non-linearity correction.

BACKGROUND

Wireless communication systems are widely deployed to provide various services that may include carrying voice, test/messaging, video, data, or other traffic. The services may include unicast, multicast, or broadcast services, among other examples. Typical wireless communication systems may employ multiple-access radio access technologies (RATs) capable of supporting communication with multiple users by sharing available system resources (for example, including bandwidth or transmit power). Examples of such multiple-access RATs include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

The above multiple-access technologies have been adopted in various telecommunication standards to provide common protocols that enable different wireless communication devices to communicate on a municipal, national, regional, or global level. An example telecommunication standard is New Radio (NR). NR, which may also be referred to as 5G, is part of a continuous mobile broadband evolution promulgated by the Third Generation Partnership Project (3GPP). NR (and other mobile broadband evolutions beyond NR) may be designed to better support Internet of things (IoT) and reduced capability device deployments, industrial connectivity, millimeter wave (mmWave) expansion, licensed and unlicensed spectrum access, non-terrestrial network (NTN) deployment, sidelink and other device-to-device direct communication technologies, massive multiple-input multiple-output (MIMO), disaggregated network architectures and network topology expansions, or high-precision positioning, among other examples. As the demand for mobile broadband access continues to increase, further improvements in NR may be implemented, and other radio access technologies such as 6G may be introduced to further advance mobile broadband evolution.

Some wireless communication devices, such as a user equipment (UE) or a network entity or node (such as a base station) may transmit and receive wideband communications (for example, having bandwidths of 1 GHz to 10 GHz) or transmit and receive communications at high frequencies (for example, SubThz frequencies). Transmitting at high frequencies or with wide bandwidths may increase a consumption of power resources of the transmitting wireless communication device as compared to transmitting using LTE or sub-6 GHz frequency ranges. To reduce power consumption, the transmitting device may reduce a power supplied (for example, apply a backoff) to a power amplifier (PA), which may reduce power consumption at a cost of the PA operating with a reduced linear region. A linear region of a PA refers to a range of power values that may be input to the PA for which the associated power values output from the PA increase linearly with an increase in the input power values. When a PA operates in a non-linear region, the output power is not linearly related to the input power, which may cause the wireless communication device to transmit a signal with an unintended reduced power. In such case, a receiving device may have increased demodulation and decoding errors (for example, when mapping a sample of the received signal to a constellation point associated with a configured modulation scheme).

In some networks, a receiving device may perform digital post-distortion (DPoD) correction (also referred to as DPoD) on a received signal, in which the receiving device performs nonlinearity estimation and correction. In this way, the receiving device may reduce demodulation and decoding errors that may have otherwise been caused by the PA of the transmitting device operating in a nonlinear region. Additionally, the receiving device may estimate the nonlinearity and provide feedback to the transmitting device. The transmitting device may then use the feedback to correct for effects of the nonlinearity before transmitting a communication in a procedure referred to as digital pre-distortion (DPD) correction (also referred to as DPD).

SUMMARY

Some aspects described herein relate to a method of wireless communication performed by a user equipment (UE). The method may include receiving one or more reference signals from a network node that includes a plurality of power amplifiers (PAs) for transmissions. The method may include transmitting, to the network node, an indication of PA non-linearity (NL) coefficients associated with NL of the PAs of the network node in association with measurements of the one or more reference signals. The method may include receiving, from the network node, one or more communications having a precoding in accordance with the PA NL coefficients.

Some aspects described herein relate to a method of wireless communication performed by a network node. The method may include transmitting one or more reference signals from a network node that includes a plurality of PAs for transmissions. The method may include receiving, from a UE, an indication of PA NL coefficients associated with NL of the PAs of the network node in association with measurements of the one or more reference signals. The method may include transmitting, to the UE, one or more communications having a precoding in accordance with the PA NL coefficients.

Some aspects described herein relate to a UE for wireless communication. The user equipment may include at least one memory and at least one processor coupled with the at least one memory. The at least one processor may be operable to cause the user equipment to receive one or more reference signals from a network node that includes a plurality of PAs for transmissions. The at least one processor may be operable to cause the user equipment to transmit, to the network node, an indication of PA NL coefficients associated with NL of the PAs of the network node in association with measurements of the one or more reference signals. The at least one processor may be operable to cause the user equipment to receive, from the network node, one or more communications having a precoding in accordance with the PA NL coefficients.

Some aspects described herein relate to a network node for wireless communication. The network node may include at least one memory and at least one processor coupled with the at least one memory. The at least one processor may be operable to cause the network node to transmit one or more reference signals from a network node that includes a plurality of PAs for transmissions. The at least one processor may be operable to cause the network node to receive, from a UE, an indication of PA NL coefficients associated with NL of the PAs of the network node in association with measurements of the one or more reference signals. The at least one processor may be operable to cause the network node to transmit, to the UE, one or more communications having a precoding in accordance with the PA NL coefficients.

Some aspects described herein relate to a non-transitory computer-readable medium that stores a set of instructions for wireless communication by a UE. The set of instructions, when executed by one or more processors of the UE, may cause the UE to receive one or more reference signals from a network node that includes a plurality of PAs for transmissions. The set of instructions, when executed by one or more processors of the UE, may cause the UE to transmit, to the network node, an indication of PA NL coefficients associated with NL of the PAs of the network node in association with measurements of the one or more reference signals. The set of instructions, when executed by one or more processors of the UE, may cause the UE to receive, from the network node, one or more communications having a precoding in accordance with the PA NL coefficients.

Some aspects described herein relate to a non-transitory computer-readable medium that stores a set of instructions for wireless communication by a network node. The set of instructions, when executed by one or more processors of the network node, may cause the network node to transmit one or more reference signals from a network node that includes a plurality of PAs for transmissions. The set of instructions, when executed by one or more processors of the network node, may cause the network node to receive, from a UE, an indication of PA NL coefficients associated with NL of the PAs of the network node in association with measurements of the one or more reference signals. The set of instructions, when executed by one or more processors of the network node, may cause the network node to transmit, to the UE, one or more communications having a precoding in accordance with the PA NL coefficients.

Some aspects described herein relate to an apparatus for wireless communication. The apparatus may include means for receiving one or more reference signals from a network node that includes a plurality of PAs for transmissions. The apparatus may include means for transmitting, to the network node, an indication of PA NL coefficients associated with NL of the PAs of the network node in association with measurements of the one or more reference signals. The apparatus may include means for receiving, from the network node, one or more communications having a precoding in accordance with the PA NL coefficients.

Some aspects described herein relate to an apparatus for wireless communication. The apparatus may include means for transmitting one or more reference signals from a network node that includes a plurality of PAs for transmissions. The apparatus may include means for receiving, from a UE, an indication of PA NL coefficients associated with NL of the PAs of the network node in association with measurements of the one or more reference signals. The apparatus may include means for transmitting, to the UE, one or more communications having a precoding in accordance with the PA NL coefficients.

Aspects generally include a method, apparatus, system, computer program product, non-transitory computer-readable medium, user equipment, base station, network node, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
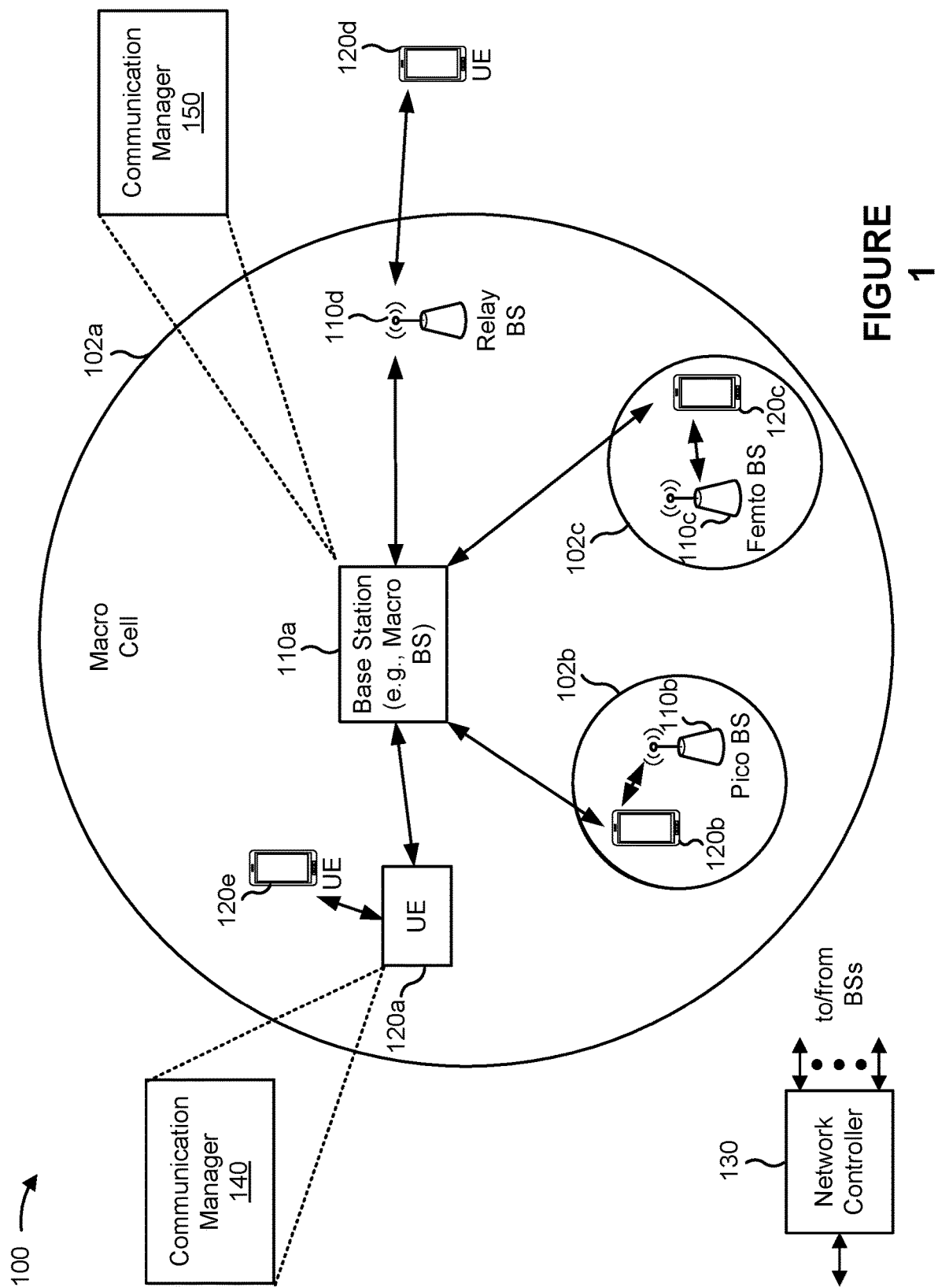
FIG. 1 is a diagram illustrating an example of a wireless network in accordance with the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Various aspects relate generally to precoding communications with a precoding configured to improve reception of communications transmitted with non-linearity (NL). Some aspects more specifically relate to a user equipment (UE) obtaining power amplifier (PA) NL coefficients associated with NL of PAs of a network node. The UE may transmit an indication of the PA NL coefficients to the network node, which may use the PA NL coefficients to select a precoding configured to improve reception of communications transmitted with PA NL or to improve decoding of communications transmitted using the precoding.

Particular aspects of the subject matter described in this disclosure can be implemented to realize one or more of the following potential advantages. In some examples, the described techniques can be used to improve latency and reduce power consumption that may have otherwise been used for a digital post-distortion (DPoD) correction operation performed by the UE. For example, in association with using precoding selected to improve reception of communications transmitted with PA NL, the UE may avoid performing DPoD correction, the network node may avoid performing digital pre-distortion (DPD) correction, or the UE may reduce a number of iterations of DPoD correction used to decode a communication.

FIG. 1 is a diagram illustrating an example of a wireless network 100 in accordance with the present disclosure. The wireless network 100 may be or may include elements of a 5G (for example, NR) network or a 6G network, among other examples. The wireless network 100 may include multiple network nodes 110 (also referred to as network entities) (shown as a network node (NN) 110a, a network node 110b, a network node 110c, and a network node 110d), that support communications with multiple UEs 120 (shown as a UE 120a, a UE 120b, a UE 120c, a UE 120d, and a UE 120e).

A network node 110 may include one or more devices that enable communication between a UE 120 and the wireless network 100. A network node 110 may be, include, or be referred to as, for example, an NR network node, a 6G network node, a Node B, an eNB (for example, in 4G), a gNB (for example, in 5G), an access point (AP), a transmission reception point (TRP), a mobility element of a network, a core network node, a network element, a network equipment, or another type of device or devices included in a radio access network (RAN). As shown, a network node 110 may refer to a single physical node or may collectively refer to two or more physical nodes. For example, "a/the network node 110" may refer to a device or system that implements part of a radio protocol stack, a device or system that implements a full protocol stack (such as a full gNB protocol stack), or a collection of devices or systems that collectively implement the full protocol stack. For example, a network node 110 may be an aggregated network node, meaning that the network node 110 may utilize a radio protocol stack that is physically and logically integrated within a single node in the wireless network 100. For example, a network node 110 (an aggregated network node) may consist of a single standalone base station or a single TRP that may utilize a full radio protocol stack to enable or facilitate communication between a UE 120 and a core network of or associated with the wireless network 100.

Alternatively, a network node 110 may be a disaggregated network node (sometimes referred to as a disaggregated base station), meaning that the network node 110 may utilize a protocol stack that is physically distributed or logically distributed among two or more nodes in the same geographic location or in different geographic locations. In some deployments, disaggregated network nodes 110 may be utilized in an integrated access and backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into multiple units that can be individually deployed.

The network nodes 110 of the wireless network 100 may include one or more central units (CUs), one or more distributed units (DUs), or one or more radio units (RUs). A CU may communicate with one or more DUs via respective midhaul links, such as through F1 interfaces. Each of the DUs may communicate with one or more RUs via respective fronthaul links. Each of the 340 may communicate with one or more UEs 120 via respective radio frequency (RF) access links. In some deployments, a UE 120 may be simultaneously served by multiple RUs.

A CU generally operates to may host one or more higher layer control functions. Such control functions can include radio resource control (RRC) functions, packet data convergence protocol (PDCP) functions, or service data adaptation protocol (SDAP) functions, among other examples. A CU may handle user plane functionality (for example, Central Unit-User Plane (CU-UP) functionality), or control plane functionality (for example, Central Unit-Control Plane (CU-CP) functionality). A DU generally may host one or more of a radio link control (RLC) layer, a medium access control (MAC) layer, and one or more high physical (PHY) layers depending, at least in part, on a functional split, such as a functional split defined by the 3GPP. A DU may further host one or more low PHY layers, such as implemented by one or more modules for a fast Fourier transform (FFT), an inverse FFT (iFFT), beamforming, or physical random access channel (PRACH) extraction and filtering, scheduling of resources for one or more UEs 120, among other examples. An RU generally hosts RF processing functions or low-PHY layer functions, such as performing an FFT, performing an iFFT, beamforming, or PRACH extraction and filtering, among other examples, based on a functional split such as a lower layer functional split. In such an architecture, each RU can be operated to handle over the air (OTA) communication with one or more UEs 120.

In some aspects, a network node 110 may include a combination of one or more CUs, one or more DUs, one or more RUs, one or more IAB nodes, one or more Near-Real Time (Near-RT) RAN Intelligent Controllers (RICs), or one or more Non-Real Time (Non-RT) RICs in the wireless network 100. In some examples, a CU, a DU, or an RU may be implemented as a virtual unit, such as a virtual central unit (VCU), a virtual distributed unit (VDU), or a virtual radio unit (VRU), among other examples.

In some examples, a network node 110 may be or include or may operate as an RU, a TRP, or a base station that communicates with UEs 120 via a radio access link (which may be referred to as a "Uu" link). The radio access link may include a downlink and an uplink. "Downlink" (or "DL") refers to a communication direction from a network node 110 to a UE 120, and "uplink" (or "UL") refers to a communication direction from a UE 120 to a network node 110. Downlink channels may include one or more control channels on which control information (for example, scheduling information, reference signals, configuration information) may be transmitted from a network node 110 to a UE 120, and one or more data channels on which data (for example, data associated with a UE 120) may be transmitted from a network node 110 to a UE 120. Downlink control channels may include one or more physical downlink control channels (PDCCHs), and downlink data channels may include one or more physical downlink shared channels (PDSCHs). Uplink channels may include one or more control channels on which control information (for example, feedback for one or more downlink transmissions, reference signals) may be transmitted from a UE 120 to a network node 110, and one or more data channels on which data (for example, data associated with a UE 120) may be transmitted from a UE 120 to a network node 110. Uplink control channels may include one or more physical uplink control channels (PUCCHs), and uplink data channels may include one or more physical uplink shared channels (PUSCHs). The downlink and the uplink may each include a set of resources on which the network node 110 and the UE 120 may communicate.

Various different types of network nodes 110 may generally transmit at different power levels, serve different coverage areas, or have different impacts on interference in the wireless network 100 than other types of network nodes 110. For example, macro network nodes may have a high transmit power level (for example, 5 to 40 watts), whereas pico network nodes, femto network nodes, and relay network nodes may have lower transmit power levels (for example, 0.1 to 2 watts). In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (for example, three) cells. In some examples, a cell may not necessarily be stationary, and the geographic area of the cell may move according to the location of a network node 110 that is mobile (for example, a mobile network node such as a train, a satellite base station, a drone, or a non-terrestrial network (NTN) network node).

A network controller 130 may communicate with a network node 110 via a backhaul communication link. A network controller 130 may couple to or communicate with a set of network nodes 110 and may provide coordination and control for these network nodes 110. The wireless network 100 may include one or more such network controllers 130. Additionally or alternatively, a core network of or associated with the wireless network 100 may include one or more network controllers 130. The backhaul link may facilitate communication between the wireless network 100 and the core network. In some aspects, the network controller 130 may be, include, or be included in a CU or a core network device.

A network node 110 that relays communications may be referred to as a relay station, a relay network node, or a relay. A relay station may receive a transmission of data from an upstream station (for example, a network node 110 or a UE 120) and send a transmission of the data to a downstream station (for example, a UE 120 or a network node 110). In the example shown in FIG. 1, the network node 110d (for example, a relay network node) may communicate with the network node 110a (for example, a macro network node) and the UE 120d in order to facilitate communication between the network node 110a and the UE 120d. Additionally or alternatively, a UE 120 may be or may operate as a relay station that can relay transmissions to or from other UEs 120. A UE 120 that relays communications may be referred to as a UE relay or a relay UE, among other examples.

The UEs 120 may be physically dispersed throughout the wireless network 100, and each UE 120 may be stationary or mobile. A UE 120 may be, include, or be included in, for example, an access terminal, a terminal, a mobile station, or a subscriber unit. An access terminal, a terminal, a mobile station, or a subscriber unit may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter or sensor, industrial manufacturing equipment, a Global Positioning System device (or other position device), a UE function of a network node, or any other suitable device or function that may communicate via a wireless medium.

Some UEs 120 may be considered machine-type communication (MTC) or evolved or enhanced machine-type communication (eMTC) UEs. An MTC UE or an eMTC UE may be, be included within, or be coupled with, for example, a robot, a drone, a remote device, a sensor, a meter, a monitor, or a location tag, that may communicate with a network node, another device (for example, a remote device), or some other entity. Some UEs 120 may be considered IoT devices, or may be implemented as NB-IoT (narrowband IoT) devices. An IoT UE or NB-IoT device may be, be included within, or be coupled with, for example, an industrial machine, a refrigerator, a doorbell camera device, a home automation device, or a light fixture, among other examples. Some UEs 120 may be considered Customer Premises Equipment, which may be telecommunications devices that are installed at a customer location (such as a home or office) to enable access to a service provider's network (such as the wireless network 100).

A UE 120 may include, or may be included in, a housing that houses components of the UE 120, such as processor components or memory components. One or more of the processor components may be coupled with one or more of the memory components or other components. For example, the processor components (for example, one or more processors) and the memory components (for example, a memory) may be operatively coupled, communicatively coupled, electronically coupled, or electrically coupled.

In some aspects, two or more UEs 120 (for example, shown as UE 120a and UE 120e) may communicate directly with one another using one or more sidelink communications (for example, without communicating by way of a network node 110 as an intermediary). As an example, the UE 120a may transmit data, control information or other signaling as a sidelink communication to the UE 120e directly. This is in contrast to, for example, the UE 120a first transmitting data in an UL communication to a network node 110, which then transmits the data to the UE 120e in a DL communication. In various examples, the UEs 120 may communicate using peer-to-peer (P2P) communication protocols, device-to-device (D2D) communication protocols, vehicle-to-everything (V2X) communication protocols (which may include vehicle-to-vehicle (V2V) protocols, vehicle-to-infrastructure (V2I) protocols, or vehicle-to-pedestrian (V2P) protocols), or mesh network communication protocols. In some deployments and configurations, a network node 110 may still schedule or allocate resources for sidelink communications between UEs 120 in the wireless network 100. In some other deployments and configurations, a UE 120 may perform, or collaborate or negotiate with one or more other UEs to perform, scheduling operations, resource selection operations, or other operations described elsewhere herein for sidelink communications instead of a network node 110.

Downlink and uplink resources may include time domain resources (frames, subframes, slots, symbols), frequency domain resources (frequency bands, frequency carriers, subcarriers, resource blocks, resource elements), spatial domain resources (particular transmit directions or beam parameters), or a combination thereof. Frequency domain resources of some bands may be subdivided into bandwidth parts (BWPs). A BWP may refer to a continuous block of frequency domain resources (for example, a continuous block of resource blocks) that are allocated for one or more UEs 120. A UE 120 may be configured with both an uplink BWP and a downlink BWP. A BWP may be dynamically configured (for example, by a network node 110 transmitting a dynamic control information (DCI) configuration to the one or more UEs 120) or reconfigured, which means that a BWP can be adjusted in real-time (or near-real-time) based on changing network conditions in the wireless network 100 or based on the specific requirements of the one or more UEs 120. This allows for more efficient use of the available frequency domain resources in the wireless network 100 in that smaller amounts of frequencies may be allocated to a BWP for a UE (which may reduce the amount of frequencies that a UE 120 is required to monitor), leaving a greater amount of frequencies to be spread across multiple UEs 120.

Generally, BWPs are configured as a subset or a part of total carrier bandwidth. A BWP forms a set of contiguous common resource blocks (CRBs) within the full component carrier bandwidth. In other words, within the carrier bandwidth, a BWP starts at a CRB and may span over a set of consecutive CRBs. Each BWP may be associated with its own numerology (sub-carrier spacing (SCS) and cycling prefix (CP)). A UE 120 may be configured with up to four downlink BWPs and up to four uplink BWPs for each serving cell. To enable reasonable UE battery consumption, only one BWP in the downlink and one in the uplink, are generally active at a given time on an active serving cell under typical operation. The active BWP defines the UE 120's operating bandwidth within the cell's operating bandwidth, and all other BWPs that the UE 120 is configured with are deactivated. On deactivated BWPs, the UE 120 does not transmit or receive any data.

Some network nodes 110 (for example, a base station, an RU, a TRP) may provide communication coverage for a particular geographic area. In the Third Generation Partnership Project (3GPP), the term "cell" can refer to a coverage area of a network node 110 or a network node subsystem serving such a coverage area, depending on the context in which the term is used. In some examples, a network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. As is evident, the wireless network 100 may be a heterogeneous network that includes network nodes 110 of different types, such as macro network nodes, pico network nodes, femto network nodes, relay network nodes, aggregated network nodes, or disaggregated network nodes, among other examples.

In some examples, a UE 120 operate in association with a discontinuous reception (DRX) configuration (for example, provided to the UE 120 by a network node 110). DRX operation may enable the UE 120 to sleep at various times while in the coverage area of a network node 110 to reduce power consumption for conserving battery resources, among other examples. The DRX configuration may configure the UE 120 operate in association with a DRX cycle. A DRX cycle may include a DRX on duration (a duration during which the UE 120 is awake or in an active state) and one or more opportunities to enter a DRX sleep mode in which the UE 120 may refrain from monitoring for communications from a network node 110. The UE 120 may also deactivate antennas, RF chains, or other hardware devices during the DRX sleep mode. The time during which the UE 120 is configured to be in the active mode during a DRX on duration in which the UE 120 operates in an active mode, and the time during which the UE 120 is configured to be in a DRX sleep mode may be referred to as an inactive time. During a DRX on duration, the UE 120 may monitor for downlink communications from the network nodes 110. If the UE 120 does not detect or successfully decode any downlink communications during the DRX on duration, the UE 120 may enter a DRX sleep mode for the inactive time duration at the end of the DRX on duration. The UE 120 may repeat DRX cycles with a configured periodicity according to the DRX configuration. If the UE 120 detects or successfully decodes a downlink communication during the DRX on duration, the UE 120 may remain in the active mode for the duration of a DRX inactivity timer (which may extend the active time). The UE 120 may start the DRX inactivity timer at a time at which the downlink communication is received. The UE 120 may remain in the active mode until the DRX inactivity timer expires, at which time the UE 120 may transition to the sleep mode for an inactive time duration.

Devices (for example, UEs 120, network nodes 110) of the wireless network 100 may communicate using the electromagnetic spectrum, which may be subdivided by frequency or wavelength into various classes, bands, carriers, or channels. For example, devices of the wireless network 100 may communicate using one or more operating bands. In some aspects, multiple wireless networks 100 may be deployed in a given geographic area. Each wireless network 100 may support a particular radio access technology (RAT) (which may also be referred to as an air interface) and may operate on one or multiple carrier frequencies in one or multiple frequency ranges such as 410 MHz-7.125 GHz or 24.25 GHz-52.6 GHz, among other examples. Examples of RATs include a 4G RAT, a 5G/NR RAT, or a 6G RAT, among other examples. In some examples, when multiple RATs are deployed in a given geographic area, each RAT in the geographic area may operate on different frequencies in order to avoid interference with one another.

Various operating bands have been defined as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. An operating band for these mid-band frequencies may be referred to as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands may extend 5G NR operation, 6G operation, or other RATs beyond 52.6 GHz. For example, three higher operating bands may be referred to as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, the term "sub-6 GHz," if used herein, may broadly refer to frequencies that may be less than 6 GHz, may be within FR1, or may include mid-band frequencies. Further, unless specifically stated otherwise, the term "millimeter wave," if used herein, may broadly refer to frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein may be applicable to those modified frequency ranges.

In some aspects, the UE 120 may include a communication manager 140. As described in more detail elsewhere herein, the communication manager 140 may receive one or more reference signals from a network node that includes a plurality of power amplifiers (PAs) for transmissions; transmit, to the network node, an indication of PA non-linearity (NL) coefficients associated with NL of the PAs of the network node in association with measurements of the one or more reference signals; and receive, from the network node, one or more communications having a precoding in accordance with the PA NL coefficients. Additionally, or alternatively, the communication manager 140 may perform one or more other operations described herein.

In some aspects, the network node 110 may include a communication manager 150. As described in more detail elsewhere herein, the communication manager 150 may transmit one or more reference signals from a network node that includes a plurality of PAs for transmissions; receive, from a UE, an indication of PA NL coefficients associated with NL of the PAs of the network node in association with measurements of the one or more reference signals; and transmit, to the UE, one or more communications having a precoding in accordance with the PA NL coefficients. Additionally, or alternatively, the communication manager 150 may perform one or more other operations described herein.

Figure 2:
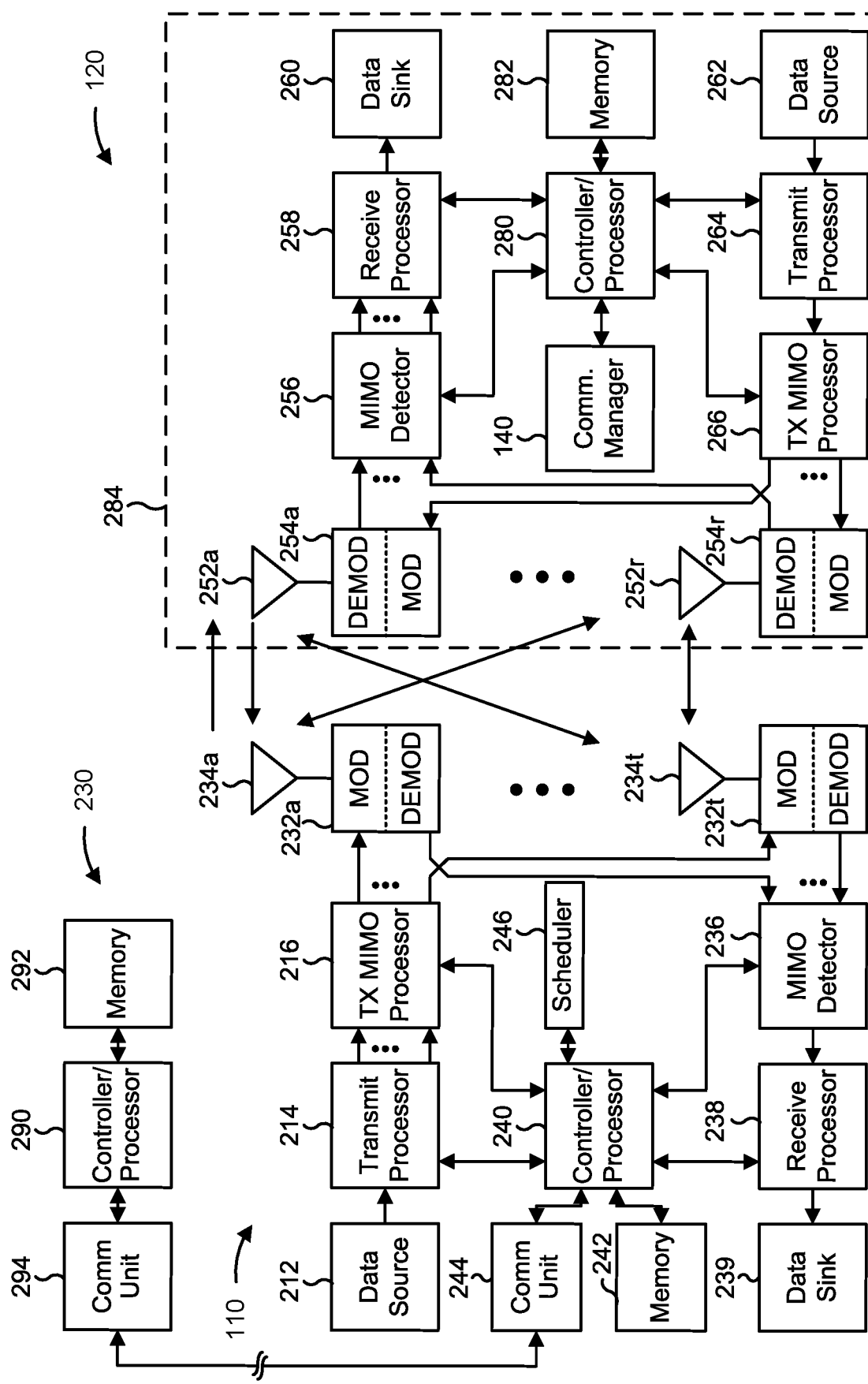
FIG. 2 is a diagram illustrating an example network node in communication with a user equipment (UE) in a wireless network in accordance with the present disclosure.

FIG. 2 is a diagram illustrating an example network node 110 in communication with a UE 120 in a wireless network in accordance with the present disclosure. The network node 110 of FIG. 2 may be an example of the network node 110 described with reference to FIG. 1. Similarly, the UE 120 may be an example of the UE 120 described with reference to FIG. 1.

As shown in FIG. 2, the network node 110 may include a data source 212, a transmit processor 214, a transmit (TX) multiple-input multiple-output (MIMO) processor 216, a set of modems 232 (such as 232*a* through 232*t*, where t≥1), a set of antennas 234 (such as 234*a* through 234*t*, where t≥1), a MIMO detector 236, a receive processor 238, a data sink 239, a controller/processor 240, a memory 242, a communication unit 244, or a scheduler 246, among other examples. In some aspects, one or a combination of the antenna(s) 234, the modem(s) 232, the MIMO detector 236, the receive processor 238, the transmit processor 214, or the TX MIMO processor 216 may be included in a transceiver of the network node 110. The transceiver may be used by a processor (for example, the controller/processor 240) and the memory 242 to perform aspects of the methods, processes or operations described herein. The term "controller/processor" may refer to one or more controllers or one or more processors. In some aspects, the network node 110 may include an interface, a communication component, or another component that facilitates communication with the UE 120 or another network node.

For downlink communication, the transmit processor 214 may receive data ("downlink data") from the data source 212 (such as a data pipeline or a data queue). The data is intended for the UE 120 (or a set of UEs 120). In some implementations, the transmit processor 214 may select one or more modulation and coding schemes (MCSs) for the UE 120 in accordance with one or more channel quality indicators (CQIs) received from the UE 120. The network node 110 may process the data (for example, including encoding the data) for transmission to the UE 120 on a downlink in accordance with the MCS(s) selected for the UE 120 to generate data symbols. The transmit processor 214 may process system information (for example, for semi-static resource partitioning information (SRPI)) and control information (for example, CQI requests, grants, or upper layer signaling) and provide overhead symbols and control symbols. The transmit processor 214 may generate reference symbols for reference signals (for example, a cell-specific reference signal (CRS), a demodulation reference signal (DMRS), or a channel state information (CSI) reference signal (CSI-RS)) and synchronization signals (for example, a primary synchronization signal (PSS) or a secondary synchronization signals (SSS)).

The TX MIMO processor 216 may perform spatial processing (for example, precoding) on the data symbols, the control symbols, the overhead symbols, or the reference symbols, if applicable, and may provide a set of output symbol streams (for example, T output symbol streams) to the set of modems 232. For example, each output symbol stream may be provided to a respective modulator component (shown as MOD) of a modem 232. Each modem 232 may use the respective modulator component to process (for example, to modulate) a respective output symbol stream (for example, for orthogonal frequency division multiplexing (OFDM)) to obtain an output sample stream. Each modem 232 may further use the respective modulator component to process (for example, convert to analog, amplify, filter, or upconvert) the output sample stream to obtain a time domain downlink signal. The modems 232a through 232t may together transmit a set of downlink signals (for example, T downlink signals) via the corresponding set of antennas 234.

A downlink signal may include a DCI communication, a MAC control element (MAC-CE) communication, an RRC communication, a downlink reference signal, or another type of downlink communication. Downlink signals may be transmitted on a PDCCH, a PDSCH, or on another downlink channel. A downlink signal may carry one or more transport blocks (TBs) of data. A TB may refer to a unit of data that is transmitted over an air interface in the wireless network 100. A data stream (for example, from the data source 212) may generally be encoded into multiple TBs for transmission over the air interface. The quantity of TBs used for carrying the data associated with a particular data stream may be associated with a transport block size common to the multiple TBs. The TB size may be based on or otherwise associated with radio channel conditions on the air interface, the MCS used for encoding the data, the downlink resources allocated for transmitting the data, or another parameter. In general, the larger the TB size, the greater the amount of data that can be transmitted in a single transmission, which reduces signaling overhead. However, larger TB sizes may be more prone to transmission or reception errors, but such errors may be mitigated by more robust error correction techniques.

For uplink communication, uplink signals from a UE 120 or other UEs may be received by an antenna 234, may be processed by a modem 232 (for example, a demodulator component, shown as DEMOD, of a modem 232), may be detected by the MIMO detector 236 (for example, a receive (Rx) MIMO processor) if applicable, or may be further processed by the receive processor 238 to obtain decoded data and control information sent by the UE 120. The receive processor 238 may provide the decoded data to a data sink 239 (which may be a data pipeline, a data queue, or another data sink) and provide the decoded control information to the controller/processor 240.

One or more antennas of the set of antennas 234 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2.

Each of the antenna elements of an antenna 234 may include one or more sub-elements for radiating or receiving radio frequency signals. For example, a single antenna element may include a first sub-element cross-polarized with a second sub-element that can be used to independently transmit cross-polarized signals. The antenna elements may include patch antennas, dipole antennas, or other types of antennas arranged in a linear pattern, a two-dimensional pattern, or another pattern. A spacing between antenna elements may be such that signals with a desired wavelength transmitted separately by the antenna elements may interact or interfere constructively and destructively along various directions (for example, which may form a beam). For example, given an expected range of wavelengths or frequencies, the spacing may provide a quarter wavelength, half wavelength, or other fraction of a wavelength of spacing between neighboring antenna elements to allow for the desired constructive and destructive interference patterns of signals transmitted by the separate antenna elements within that expected range.

The amplitudes or phase of signals transmitted via antenna elements or sub-elements may be modulated and shifted relative to each other so as to generate one or more beams. A beam may at a basic level refer to a directional transmission of a wireless signal toward a receiving device or otherwise in a desired direction. A beam may also generally refer to a direction associated with such a directional signal transmission, a set of directional resources associated with the signal transmission (for example, angle of arrival, horizontal direction, or vertical direction), or a set of parameters that indicate one or more aspects of a directional signal, a direction associated with the signal, or a set of directional resources associated with the signal. Beamforming includes generation of a beam using multiple signals on different antenna elements, where one or more, or all, of the multiple signals are shifted in phase relative to each other. In some implementations, antenna elements may be individually selected or deselected for transmission of a signal (or signals) by controlling amplitudes of one or more corresponding amplifiers or phases to form a beam. The shape of a beam (such as the amplitude, width, or presence of side lobes) or the direction of a beam (such as an angle of the beam relative to a surface of an antenna array) can be dynamically controlled by modifying the phase shifts or phase offsets of the multiple signals relative to each other.

For beamforming, the network node 110 may provide the UE 120 with a configuration of transmission configuration indicator (TCI) states that respectively indicate or correspond to beams that may be used by the UE 120, such as for receiving a PDSCH. For example, the network node 110 may indicate an activated TCI state to the UE 120, which the UE 120 may use to generate a beam for receiving the PDSCH.

A beam indication (an indication of a beam) may be, or include, a TCI state information element, a beam identifier (ID), spatial relation information, a TCI state ID, a closed loop index, a panel ID, a TRP ID, or a sounding reference signal (SRS) set ID, among other examples. A TCI state information element (referred to as a TCI state herein) may indicate information associated with a beam such as a downlink beam. For example, the TCI state information element may indicate a TCI state identification (for example, a tci-StateID), a quasi-co-location (QCL) type (for example, a qcl-Type1, qcl-Type2, qcl-TypeA, qcl-TypeB, qcl-TypeC, or qcl-TypeD, among other examples), a cell identification (for example, a ServCellIndex), a bandwidth part identification (bwp-Id), a reference signal identification such as a CSI-RS (for example, a non-zero power (NZP)-CSI-RS-ResourceId or an synchronization signal block (SSB)-Index, among other examples). Spatial relation information may similarly indicate information associated with an uplink beam.

The beam indication may be a joint or separate downlink/uplink beam indication in a unified TCI framework. In some cases, the network may support a layer 1 (L1)-based beam indication using at least UE-specific (unicast) DCI to indicate joint or separate DL/UL beam indications from active TCI states. In some cases, existing DCI formats 1_1 or 1_2 may be reused for beam indication. The network node 110 may include a support mechanism for the UE 120 to acknowledge successful decoding of a beam indication. For example, the acknowledgment (ACK)/negative acknowledgment (NACK) of the PDSCH scheduled by the DCI carrying the beam indication may be also used as an ACK for the DCI.

Beam indications may be provided for carrier aggregation scenarios. In a unified TCI framework, information the network may support common TCI state ID update and activation to provide common QCL or common UL transmission spatial filter or filters across a set of configured component carriers. This type of beam indication may apply to intra-band CA, as well as to joint DL/UL and separate DL/UL beam indications. The common TCI state ID may imply that one reference signal determined according to the TCI state(s) indicated by a common TCI state ID is used to provide QCL Type-D indication and to determine UL transmission spatial filters across the set of configured CCs.

Further efficiencies in throughput, signal strength, or other signal properties may be achieved through beam refinement. The network node 110 may generally be capable of communicating with the UE 120 using beams of varying beam widths. For example, the network node 110 may be configured to utilize a wider beam when communicating with the UE 120 when the UE 120 is in motion because of the wider coverage needed to ensure that the UE 120 remains in coverage of the network node 110 when moving. The network node 120 may use a narrower beam when communicating with the UE 120 when the UE 120 is stationary because the network node 110 can reliably focus coverage on the UE 120 with low or minimal likelihood of the UE 120 moving out of the coverage area of the network node 110. In some examples, to select a particular beam for communication with a UE 120, the base station may transmit a reference signal, such as a SSB or CSI-RS, on each of a plurality of beams in a beam-sweeping manner. In some examples, SSBs may be transmitted on the wider beams, whereas CSI-RSs may be transmitted on the narrower beams. The UE 120 may measure the RSRP or the SINR on each of the beams and transmit a beam measurement report (for example, an L1 measurement report) to the network node 110 indicating the RSRP or SINR of one or more of the measured beams. The network node 110 may then select the particular beam for communication with the UE 120 based on the L1 measurement report. In other examples, when the channel is reciprocal, the network node 110 may derive the particular beam to communicate with the UE 120 based on uplink measurements of one or more uplink reference signals, such as an SRS.

The network node 110 may use the scheduler 246 to schedule one or more UEs 120 for downlink or uplink communications. In some aspects, the scheduler 246 may use DCI to dynamically schedule transmissions to the UE 120 or transmissions from the UE 120. In some aspects, the scheduler 246 may use an RRC configuration (for example, a semi-static configuration) to perform semi-persistent scheduling (SPS) or to configure a configured grant (CG) for a UE 120, where the scheduler 246 may allocate recurring time domain resources or frequency domain resources that the UE 120 may use to transmit or receive communications in the wireless network 100.

One or more of the transmit processor 214, the TX MIMO processor 216, the modem 232, the antenna 234, the MIMO detector 236, the receive processor 238, or the controller/processor 240 may be included in an RF chain of the network node 110. An RF chain may include filters, mixers, oscillators, amplifiers, analog-to-digital converters (ADCs), or other devices that convert between an analog signal (such as for transmission or reception on an air interface) and a digital signal (such as for processing by one or more processors of the network node 110). In some aspects, the RF chain may be or may be included in a transceiver of the network node 110.

The network node 110 may use the communication unit 244 to communicate with a network controller 130. The communication unit 244 may support wired or wireless communication protocols or connections such as Ethernet, optical fiber, or common public radio interface (CPRI), among other examples. The network node 110 may use the communication unit 244 to communicate with a network controller 130 to transmit or receive data associated with the UE 120 or to perform network control signaling, among other examples.

The UE 120 may include a set of antennas 252 (shown as antennas 252a through 252r, where r≥1), a set of modems 254 (shown as modems 254a through 254r, where r≥1), a MIMO detector, a receive processor 258, a data sink 260, a data source 262, a transmit processor 264, a TX MIMO processor 266, a controller/processor 280, a memory 282, or a communication manager 140, among other examples. One or more of the components of the UE 120 may be included in a housing 284. In some aspects, one or a combination of the antenna(s) 252, the modem(s) 254, the MIMO detector 256, the receive processor 258, the transmit processor 264, or the TX MIMO processor 266 may be included in a transceiver that is included in the UE 120. The transceiver may be used by a processor (for example, the controller/processor 280) and the memory 282 to perform aspects of any of the methods described herein. In some aspects, the UE 120 may include another interface, another communication component, or another component that facilitates communication with the network node 110 or another UE 120.

One or more antennas of the set of antennas 252 may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled with one or more transmission or reception components, such as one or more components of FIG. 2. In some examples, each of the antenna elements of an antenna 234 may include one or more sub-elements for radiating or receiving radio frequency signals.

For downlink communication, the set of antennas 252 may receive the downlink communications or signals from the network node 110 and may provide a set of received downlink signals (for example, R received signals) to the set of modems 254. For example, each received signal may be provided to a respective demodulator component (shown as DEMOD) of a modem 254. Each modem 254 may use the respective demodulator component to condition (for example, filter, amplify, downconvert, or digitize) a received signal to obtain input samples. Each modem 254 may use the respective demodulator component to further demodulate or process the input samples (for example, for OFDM) to obtain received symbols. The MIMO detector 256 may obtain received symbols from the set of modems 254, may perform MIMO detection on the received symbols if applicable, and may provide detected symbols. The receive processor 258 may process (for example, decode) the detected symbols, may provide decoded data for the UE 120 to a data sink 260 (such as data a data pipeline, a data queue, or an application executed on the UE 120), and may provide decoded control information and system information to a controller/processor 280.

For uplink communication, the transmit processor 264 may receive and process data ("uplink data") from a data source 262 (such as data a data pipeline, a data queue, or an application executed on the UE 120) and control information from the controller/processor 280. The control information may include one or more parameters, feedback, one or more signal measurements, or other types of control information. In some aspects, the receive processor 258 or the controller/processor 280 may determine one or more parameters for a received signal (such as received from the network node 110 or another UE), such as a reference signal received power (RSRP) parameter, a received signal strength indicator (RSSI) parameter, a reference signal received quality (RSRQ) parameter, a CQI parameter, or a transmit power control (TPC) parameter, among other examples. The control information may include an indication of the RSRP parameter, the RSSI parameter, the RSRQ parameter, the CQI parameter, or another parameter. The control information may facilitate parameter selection or scheduling for the UE 120 by the network node 110.

The transmit processor 264 may generate reference symbols for one or more reference signals, such as an uplink DMRS, an uplink SRS, or another type of reference signal. The symbols from the transmit processor 264 may be precoded by the TX MIMO processor 266 if applicable, further processed by the set of modems 254 (for example, for DFT-s-OFDM or CP-OFDM). The TX MIMO processor 266 may perform spatial processing (for example, precoding) on the data symbols, the control symbols, the overhead symbols, or the reference symbols, if applicable, and may provide a set of output symbol streams (for example, R output symbol streams) to the set of modems 254. For example, each output symbol stream may be provided to a respective modulator component (shown as MOD) of a modem 254. Each modem 254 may use the respective modulator component to process (for example, to modulate) a respective output symbol stream (for example, for OFDM) to obtain an output sample stream. Each modem 254 may further use the respective modulator component to process (for example, convert to analog, amplify, filter, or upconvert) the output sample stream to obtain an uplink signal.

The modems 254a through 254r may transmit a set of uplink signals (for example, R downlink signals) via the corresponding set of antennas 252. An uplink signal may include an uplink control information (UCI) communication, a MAC-CE communication, an RRC communication or another type of uplink communication. Uplink signals may be transmitted on a PUSCH, a PUCCH, or another type of uplink channel. An uplink signal may carry one or more transport blocks of data. Sidelink data and control transmissions (that is, transmissions directly between two or more UEs 120) may generally use similar techniques as were described for uplink data and control transmission, and may use sidelink-specific channels such as a physical sidelink shared channel (PSSCH), a physical sidelink control channel (PSCCH), or a physical sidelink feedback channel (PSFCH).

The network controller 230 may be an example of the network controller 130 described with reference to FIG. 1. The network controller 230 may include a communication unit 294, a controller/processor 290, and a memory 292. The network controller 230 may include, for example, one or more devices in a core network. The network controller 230 may communicate with the network node 110 on a backhaul link via the communication unit 294. The network controller 230 may provide the UE 120 with access to (via the network node 110 and the core network) a local area network (LAN), a wide area network (WAN) such as the Internet, a storage area network, a local data network, a private network, a content delivery network (CDN), or another network that is communicatively connected with the core network. In some aspects, the network controller 230 may facilitate access by the UE 120 to one or more services hosted in the core network, such as content delivery services, gaming services, storage services, streaming services, or another type of services.

The controller/processor 240 of the network node 110, the controller/processor 280 of the UE 120, or any other component(s) of FIG. 2 may perform one or more techniques associated with precoding for NL correction, as described in more detail elsewhere herein. For example, the controller/processor 240 of the network node 110, the controller/processor 280 of the UE 120, or any other component(s) of FIG. 2 may perform or direct operations of, for example, process 600 of FIG. 6, process 700 of FIG. 7, or other processes as described herein. The memory 242 and the memory 282 may store data and program codes for the network node 110 and the UE 120, respectively. In some examples, the memory 242 or the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 600 of FIG. 6, process 700 of FIG. 7, or other processes as described herein. In some examples, executing instructions may include running the instructions, converting the instructions, compiling the instructions, or interpreting the instructions, among other examples.

In some aspects, the UE includes means for receiving one or more reference signals from a network node that includes a plurality of PAs for transmissions; means for transmitting, to the network node, an indication of PA NL coefficients associated with NL of the PAs of the network node in association with measurements of the one or more reference signals; and/or means for receiving, from the network node, one or more communications having a precoding in accordance with the PA NL coefficients. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for transmitting one or more reference signals from a network node that includes a plurality of PAs for transmissions; means for receiving, from a UE, an indication of PA NL coefficients associated with NL of the PAs of the network node in association with measurements of the one or more reference signals; and/or means for transmitting, to the UE, one or more communications having a precoding in accordance with the PA NL coefficients. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an AP, a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, or one or more RUs).

An aggregated base station (for example, an aggregated network node) may be configured to utilize a radio protocol stack that is physically or logically integrated within a single RAN node (for example, within a single device or unit). A disaggregated base station (for example, a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a VCU, a VDU, or a VRU, among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
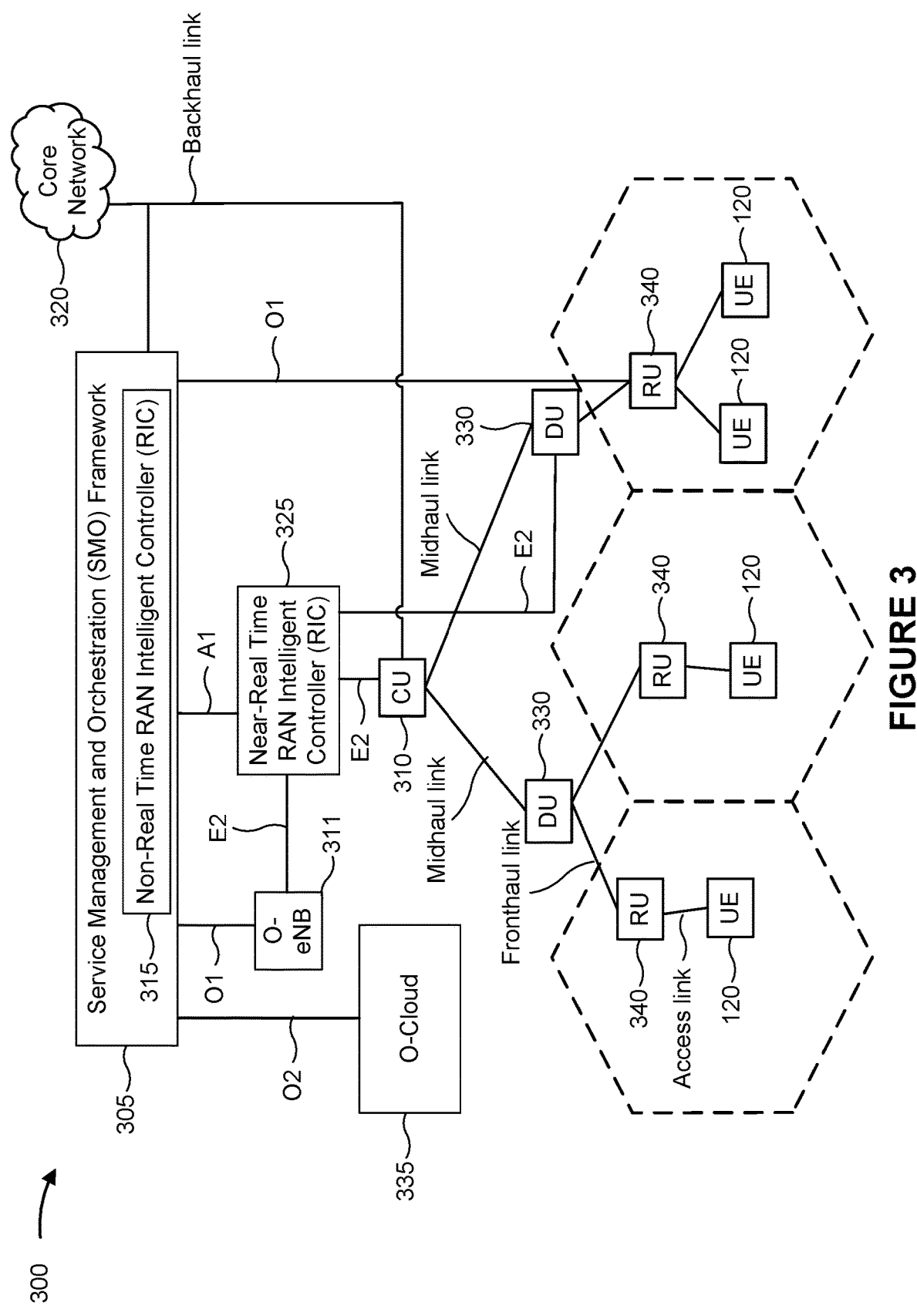
FIG. 3 is a diagram illustrating an example disaggregated base station architecture in accordance with the present disclosure.

FIG. 3 is a diagram illustrating an example disaggregated base station architecture 300 in accordance with the present disclosure. One or more components of the example disaggregated base station architecture 300 may be, include, or be included in, one or more network nodes (such one or more network nodes 110). The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). The CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective RF access links. In some deployments, a UE 120 may be simultaneously served by multiple RUs 340.

Each of the components of the disaggregated base station architecture 300, including the CUs 310, the DUs 330, the RUs 340, as well as the Near-RT RICs 325, the Non-RT RICs 315, and the SMO Framework 305, may include one or more interfaces or be coupled with one or more interfaces for receiving or transmitting signals, data, or information (collectively, signals) via a wired or wireless transmission medium.

In some aspects, the CU 310 may host one or more higher layer control functions. Such control functions can include RRC functions, PDCP functions, or SDAP functions, among other examples. Each control function can be implemented with an interface for communicating signals with other control functions hosted by the CU 310. The CU 310 may handle user plane functionality (for example, CU-UP functionality), or control plane functionality (for example, CU-CP functionality). In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be deployed to communicate with one or more DUs 330, as necessary, for network control and signaling.

Each DU 330 may correspond to a logical unit that includes one or more base station functions to control the operation of one or more RUs 340. In some aspects, the DU 330 may host one or more of an RLC layer, a MAC layer, and one or more high PHY layers depending, at least in part, on a functional split, such as a functional split defined by the 3GPP. In some implementations, the one or more high PHY layers may be implemented by one or more modules for forward error correction (FEC) encoding and decoding, scrambling, and modulation and demodulation, among other examples. In some implementations, the DU 330 may further host one or more low PHY layers, such as implemented by one or more modules for an FFT, an inverse FFT (iFFT), digital beamforming, or PRACH extraction and filtering, among other examples. Each layer (which also may be referred to as a module) can be implemented with an interface for communicating signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle OTA communication with one or more UEs 120. In some implementations, real-time and non-real-time aspects of control and user plane communication with the RU(s) 340 can be controlled by the corresponding DU 330. In some deployments, this configuration can enable each DU 330 and the CU 310 to be implemented in a cloud-based RAN architecture, such as a vRAN architecture.

The SMO Framework 305 may support RAN deployment and provisioning of non-virtualized and virtualized network elements. For non-virtualized network elements, the SMO Framework 305 may support the deployment of dedicated physical resources for RAN coverage requirements, which may be managed via an operations and maintenance interface (such as an O1 interface). For virtualized network elements, the SMO Framework 305 may interact with a cloud computing platform (such as an open cloud (O-Cloud) platform 335) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, a 5G NR RAN, or a 6G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 that supports functionality of the SMO Framework 305.

The Non-RT RIC 315 may include or implement a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an AI interface) the Near-RT RIC 325. The Near-RT RIC 325 may include or implement a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as AI interface policies).

Figure 4:
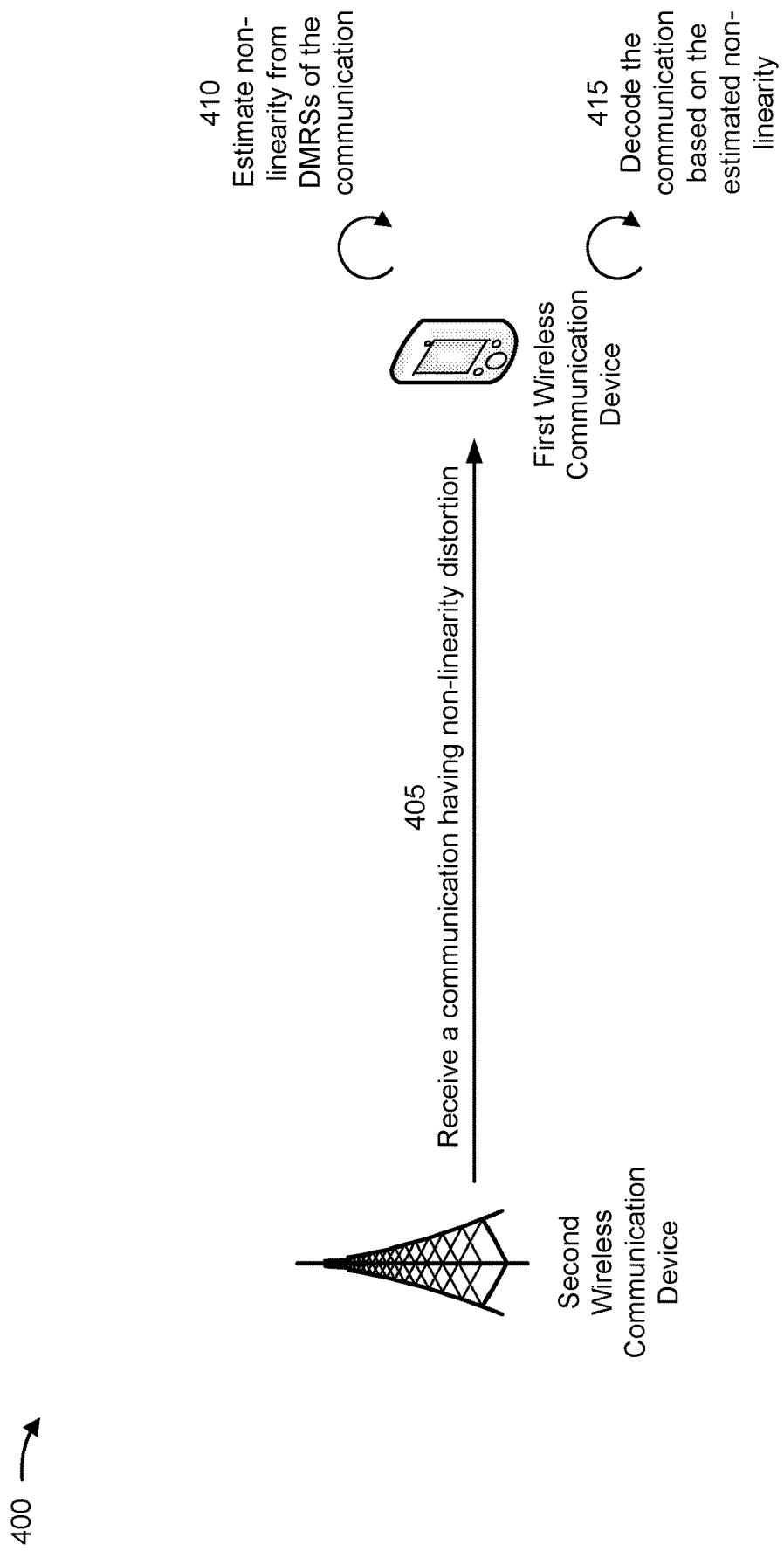
FIG. 4 is a diagram illustrating an example of communicating using non-linearity NL distortion, in accordance with the present disclosure.

FIG. 4 is a diagram illustrating an example 400 of communicating using NL distortion, in accordance with the present disclosure. As shown in FIG. 4, a first wireless communication device (WCD) and a second WCD may communicate based on transmitting communications with NL distortion and attempting to decode communications with NL distortion. The first WCD may include or may be included in a network node (for example, network node 110 or a repeater) or a UE (for example, UE 120). The second node may include or may be included in a UE (for example, UE 120) or a network node (for example, network node 110 or a repeater).

In a first operation 405, the second WCD may transmit, and the first WCD may receive, a communication having NL distortion. The second WCD may transmit the communication having NL distortion based on the second WCD using non-linear components, such as high-power PAs with limited linear dynamic range (DR), and a polynomial response. The NL distortions may be classified as an in-band distortion, which affects a link performance (for example, an error vector magnitude (EVM)), and an out-band distortion, which corresponds to an amount of adjacent channel interference (ACI).

To reduce NL distortions, power output back-off (boOut) may be used to reduce a transmission power used to transmit the communication. However, an increase in boOut may cause a reduction in power amplifier efficiency (PAE). The reduction of PAE may correspond to a reduction of power transmitted on the channel and an increase in energy dissipated as heat.

In a second operation 410, the second node may estimate NL of the communication using DMRSs or other reference signals of the communication. For example, the second node may use a sequence associated with the DMRSs to estimate NL distortion of the signal and to correct a received signal for the NL distortion. This may include DPoD correction.

In a third operation 415, the second node may decode the communication based on the estimated NL of the communication.

In some networks, PA NL is a source for RF impairment that limits achievable signal-to-noise ratio (SNR) of a communication link, which may limit the attainable data rate. Some network nodes or UEs may mitigate negative effects of PA NL by performing DPD correction, DPoD correction or both to data channel communications (for example, a transmitting device performs DPD correction, a receiving device performs DPoD correction, or both).

However, both DPD correction and DPoD correction have high complexity cost (consuming power and computing resources), which cost may increase with a quantity of transmission antennas. For example, a DPD correction unit may use a high-cost and complex RF feedback chain per each of the transmission antennas. DPoD correction may use iterations of a high-complexity procedure including multiple iFFT or FFT operations to apply NL correction.

In some aspects described herein, a transmitting device (for example, the network node) may optimize a precoder in association with PA NL at a transmission antenna array to mitigate NL distortion generated from a PA associated with the transmission antenna array. In some aspects, mitigation of the NL distortion may enable demodulation of a transmitted signal without DPoD correction by a receiving device. Alternatively, the mitigation of the NL distortion may provide an improved initial SNR or EVM, which may reduce a quantity of iterations used to reach convergence in the DPoD correction procedure.

Based at least in part on improving the SNR at receiving device when PAs are working in a non-linear region, the techniques described may enable the PA to work in a non-linear domain. In this way, the transmitting device may use lower-cost PAs (for example, reduced capability PAs), use a same PA with reduced power consumption, enable increased output power from the PA, reduce complexity and latency of the DPoD correction procedure at the receiving device, or enable increased gain performance relative to transmission antennas using other precoding.

In some aspects, a UE may transmit an indication of a capability to perform a PA-NL-aware precoder process in a network node. In some aspects, the UE may use DMRS DPoD correction on a downlink communication (for example, a reference signal, control signaling, or a data communication, among other examples) to obtain the PA NL coefficient. The UE may transmit an indication of a PA NL coefficient associated with the network node.

In some aspects, the UE may transmit the indication of the PA NL coefficient based at least in part on establishing a connection with the network node, receiving a request from the network node (for example, the network node may request the PA NL coefficient in association with a temperature change, a beam change, an antenna group change, a PA change, or expiration of a timer, among other examples), or in association with parameters of DPoD correction at the UE (for example, power consumption, available power resources, latency, or a quantity of iterations, among other examples), among other examples. The UE may transmit the indication via a control channel or a data channel, among other examples.

The network node may use the PA NL coefficients to solve an optimization formula, which the network node may use to select or generate a precoder (for example, a PA-NL-aware precoder). In some aspects, the precoder may be data-dependent or optimized in association with a group of symbols to be transmitted.

In more detail, the UE may identify the PA NL coefficient, or the network node may identify the PA NL coefficient. For example, the UE may identify the PA NL coefficient in association with performance of DPoD correction on signals received from the network node. When identified by the UE, the UE may transmit an indication to inform the network node of PA NL coefficient values. Alternatively, the network node may identify the PA NL in association with performance of DPD correction.

The network node may use knowledge from the UE (for example, the PA NL coefficient, a channel response, or noise energy, among other examples), and the network node may calculate signal-to-interference-plus-noise ratio (SINR) or SNR at the UE given a precoder:

$$SINR = |\Sigma_{i \in 1:N_{Tx}} h_i * p_i * x|^2 / \Sigma_j h_j * (\Sigma_{k \in 1:N_{kernels}} |p_i * x|^{2k} \cdot p_i * x * \alpha_{k,i})|^2 + \sigma^2$$

where $p_i$ is a precoder coefficient to maximize an SNR for a time symbol i, x is data to be transmitted, H is a channel, a is noise, a is a PA NL coefficient of a kernel of the PA NL. Time-slots are divide into time-slot-groups (TSG) to achieve accurate channel estimation by using an increased quantity of DMRSs. Each TSG may be assigned with a dedicated precoder that satisfies an optimization problem:

$$poptimize = argmax_p \{min(\{SINR_i\}_{i \in TSG})\} \text{ w.r.t rms}$$
$$(p*x_i) = rms(x_i) \forall i \in TSG.$$

This PA NL and channel-aware precoder may mitigate the PA NL at the receiver by maximizing an SINR of a lowest SINR of the TSGs. Group size may be a parameter indicated by the network node to the UE as side information. In some aspects, the network node may indicate the TSG size for the UE to use in performing the DPoD correction procedure.

In some aspects, the network node may use the precoder (for example, a PA-NL-reducing precoder) in a subsequent TSG to mitigate PA NL. The precoder may be different for different TSGs based at least in part on SINR optimization depending on data to be transmitted.

Figure 5:
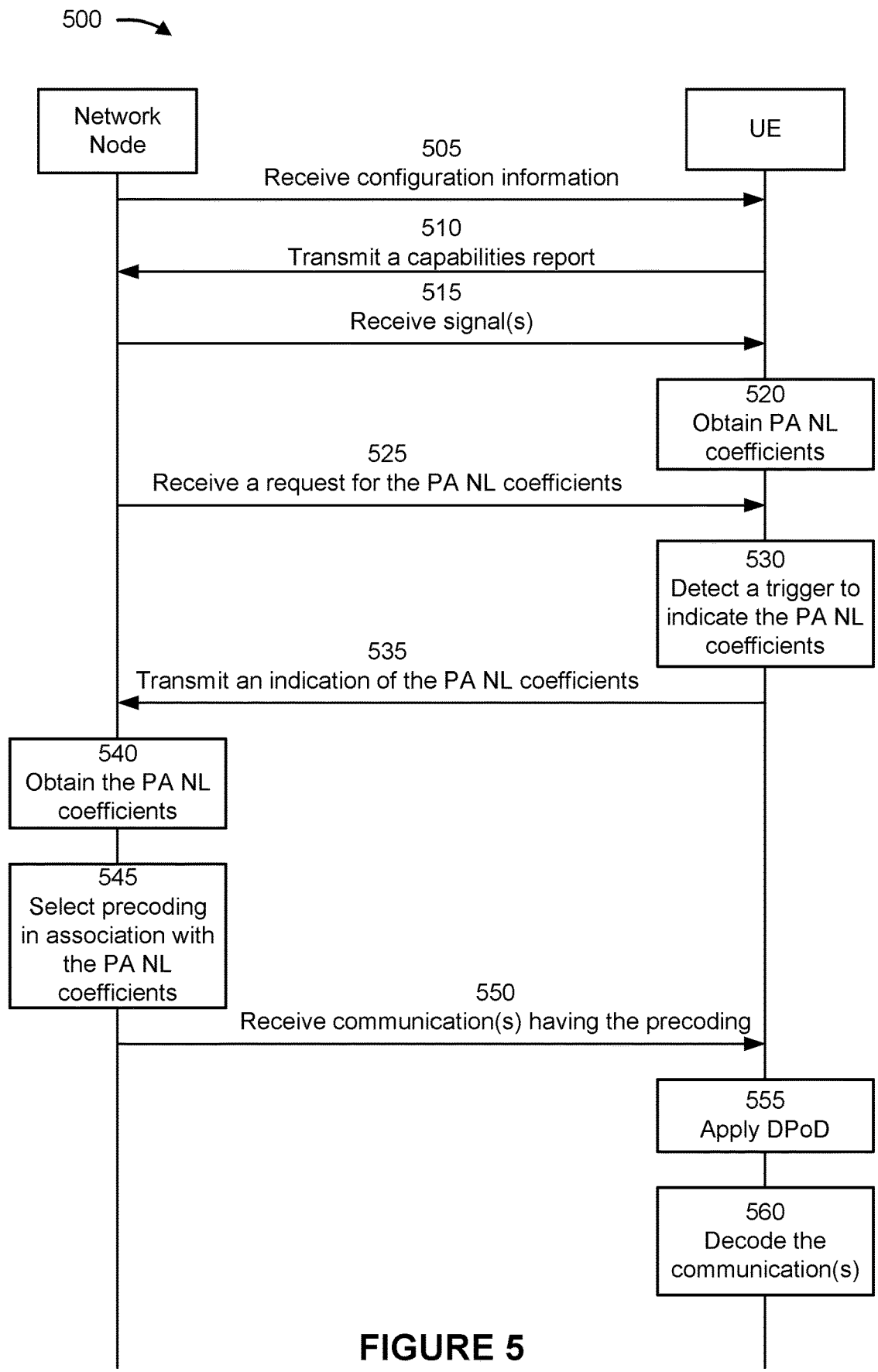
FIG. 5 is a diagram of an example associated with precoding for NL correction, in accordance with the present disclosure.

FIG. 5 is a diagram of an example 500 associated with precoding for NL correction, in accordance with the present disclosure. As shown in FIG. 5, a network node (for example, network node 110, a CU, a DU, or an RU) may communicate with a UE (for example, UE 120). In some aspects, the network node and the UE may be part of a wireless network (for example, wireless network 100). The UE and the network node may have established a wireless connection prior to operations shown in FIG. 5.

In a first operation 505, the network node may transmit, and the UE may receive, configuration information. In some aspects, the UE may receive the configuration information via one or more of RRC signaling, one or more MAC-CEs, or DCI, among other examples. In some aspects, the configuration information may include an indication of one or more configuration parameters (for example, already known to the UE or previously indicated by the network node or other network device) for selection by the UE, or explicit configuration information for the UE to use to configure the UE, among other examples.

In some aspects, the configuration information may indicate that the UE is to transmit an indication of a capability to provide PA NL coefficients to the network node for precoder selection. In some aspects, the configuration information may indicate a configuration for transmitting the PA NL coefficients (for example, via a data channel or a control channel). In some aspects, the configuration information may indicate a trigger for transmitting the PA NL coefficients, such as a time-based trigger, a temperature-based trigger, or a request-based trigger, among other examples.

The UE may configure itself based at least in part on the configuration information. In some aspects, the UE may be configured to perform one or more operations described herein based at least in part on the configuration information.

In a second operation 510, the UE may transmit, and the network node may receive, a capabilities report. In some aspects, the capabilities report may indicate UE support for obtaining PA NL coefficients associated with the network node and providing an indication of the PA NL coefficients to the network node for precoder selection.

In a third operation 515, the UE may receive, and the network node may transmit, one or more signals. For example, the network node may transmit one or more reference signals for the UE to measure. Additionally or alternatively, the network node may transmit a data communication or a control communication. In some aspects, the one or more signals are associated with a TSG. A quantity of time units included within the TSG may be associated with a communication protocol, an indication from the network node, or an indication from an additional network node, among other examples. In some aspects, the UE may measure signals from multiple TSGs and provide PA NL coefficients associated with the different TSGs.

In a fourth operation 520, the UE may obtain PA NL coefficients associated with the network node. In some aspects, the UE may perform DPoD correction on the one or more signals to obtain the PA NL coefficients.

In a fifth operation 525, the UE may receive, and the network node may transmit, a request for the PA NL coefficients. In some aspects, the network node may transmit the request in association with expiration of a timer, a change in temperature, a change in traffic volumes (associated with an increased or decreased temperature within the network node), or a change in beams or PAs used to communicate with the UE, among other examples.

In a sixth operation 530, the UE may detect a trigger to indicate the PA NL coefficients to the network node. For example, the trigger may include the request described in connection with the fifth operation 525. Additionally or alternatively, the trigger may include establishing a connection with a network node associated with transmission of the one or more communications, detecting a change in a beam, an antenna panel, or a power amplifier associated with the one or more communications, or a time-based trigger, among other examples.

In a seventh operation 535, the UE may transmit, and the network node may receive, an indication of the PA NL coefficients. In some aspects, the UE may transmit the indication within a data communication or within a control communication.

In an eighth operation 540, the network node may obtain the PA NL coefficients. In some aspects, the network node may obtain the PA NL coefficients in association with receiving the indication via the UE as described in connection with the seventh operation 535. Alternatively, the network node may obtain the PA NL in absence of operations 515-235 and may obtain the PA NL without the UE. For example, the network node may obtain the PA NL coefficients via DPD correction at the network node. Additionally or alternatively, the network node my obtain the PA NL coefficients from a different UE. For example, the different UE may use a same transmission beam of the network node for communications with the network node.

In a ninth operation 545, the network node may select precoding in association with the PA NL coefficients. In some aspects, the network node may select the precoding in association with maximizing an SNR or SINR of a lowest SNR or SINR, as estimated using the PA NL coefficients. For example, the precoding may be associated with improving a signal strength associated with a time resource having a minimum signal strength of a set of time resources associated with the one or more signals. In some aspects, the precoding is based at least in part on the PA NL coefficients and data to be transmitted in one or more communications to the UE.

In some aspects, the PA NL may be associated with precoding of the UE and one or more additional UEs. For example, the one or more additional UEs may be associated with a same network node transmission beam as the UE, a same proper subset of network node transmission beams, or a same set of PAs of the network node, among other examples. In some aspects, the network node may obtain the PA NL coefficients from a proper subset of UEs for which the network node uses the PA NL coefficients in communications. For example, the network node may receive an indication of the PA NL coefficients from a first UE and may use the PA NL coefficients for selecting a precoder for a second UE (for example, a reduced capability UE).

In a tenth operation 550, the UE may receive one or more communications having the precoding applied to improve reception of communications transmitted with PA NL or to mitigate the effects of PA NL. The network node may transmit the one or more communications with the precoding selected in the ninth operation 545 applied, and the UE may receive the one or more communications transmitted by the network node.

In an eleventh operation 555, the UE may apply DPoD correction on the one or more communications. In some aspects, the DPoD correction may use a reduced quantity of iterations as compared to iterations used for DPoD correction on a communication transmitted without the precoding selected to improve reception of communications transmitted with PA NL.

In a twelfth operation 560, the UE may decode the one or more communications. For example, the UE may decode the one or more communications responsive to, based on, or otherwise associated with applying the DPoD correction with the reduced quantity of iterations. Alternatively, the UE may decode the one or more communications without performing DPoD correction on the one or more communications. For example, the precoding may mitigate the PA NL distortion sufficiently that DPoD correction is not needed to decode the one or more communications.

In some examples, the described techniques can be used to improve latency and reduce power consumption that may have otherwise been used for a DPoD correction operation performed by the UE. For example, in association with using precoding selected to improve reception of communications transmitted with PA NL, the UE may avoid performing DPoD correction, the network node may avoid performing DPD correction, or the UE may reduce a number of iterations of DPoD correction used to decode a communication. Additionally or alternatively, responsive to, based on, or otherwise associated with improving the SNR at the receiving device when PAs are working in a non-linear region, the techniques described may enable the PA to work in a non-linear domain. In this way, the transmitting device may use lower-cost PAs (for example, reduced capability PAs), use a same PA with reduced power consumption, enable increased output power from the PA, reduce complexity and latency of the DPoD correction procedure at the receiving device, or enable increased gain performance relative to transmission antennas using other precoding.

Figure 6:
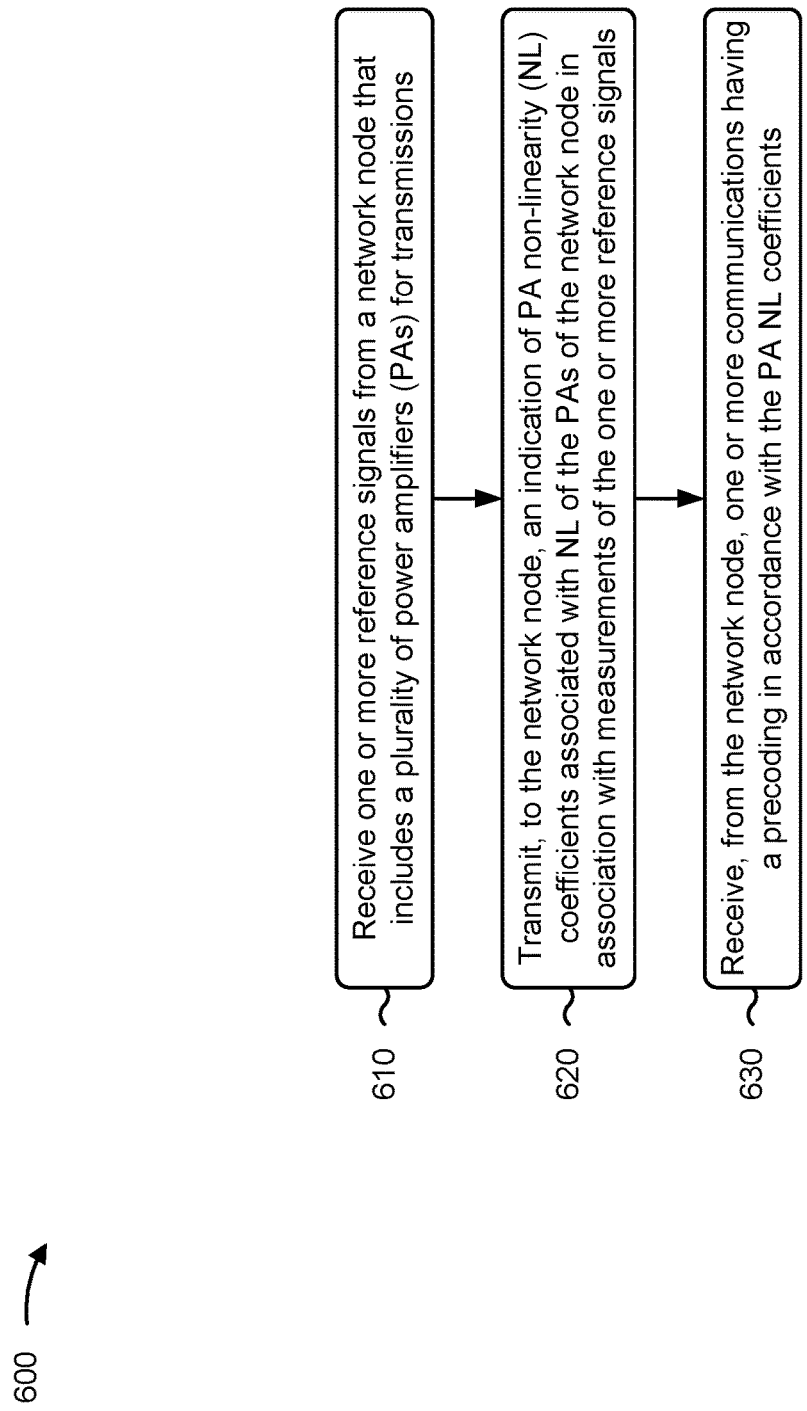
FIG. 6 is a diagram illustrating an example process performed, for example, by a UE, that supports communicating using NL distortion in accordance with the present disclosure.

FIG. 6 is a flowchart illustrating an example process 600 performed, for example, by a UE that supports precoding for NL correction in accordance with the present disclosure. Example process 600 is an example where the UE (for example, UE 120) performs operations associated with precoding for NL correction.

As shown in FIG. 6, in some aspects, process 600 may include receiving one or more reference signals from a network node that includes a plurality of PAs for transmissions (block 610). For example, the UE (such as by using communication manager 140 or reception component 802, depicted in FIG. 8) may receive one or more reference signals from a network node that includes a plurality of PAs for transmissions, as described above.

As further shown in FIG. 6, in some aspects, process 600 may include transmitting, to the network node, an indication of PA NL coefficients associated with NL of the PAs of the network node in association with measurements of the one or more reference signals (block 620). For example, the UE (such as by using communication manager 140 or transmission component 804, depicted in FIG. 8) may transmit, to the network node, an indication of PA NL coefficients associated with NL of the PAs of the network node in association with measurements of the one or more reference signals, as described above.

As further shown in FIG. 6, in some aspects, process 600 may include receiving, from the network node, one or more communications having a precoding in accordance with the PA NL coefficients (block 630). For example, the UE (such as by using communication manager 140 or reception component 802, depicted in FIG. 8) may receive, from the network node, one or more communications having a precoding in accordance with the PA NL coefficients, as described above.

Process 600 may include additional aspects, such as any single aspect or any combination of aspects described below or in connection with one or more other processes described elsewhere herein.

In a first additional aspect, the precoding is associated with improving a signal strength associated with a time resource having a minimum signal strength of a set of time resources associated with the one or more signals.

In a second additional aspect, alone or in combination with the first aspect, process 600 includes performing DPoD correction on the one or more communications.

In a third additional aspect, alone or in combination with one or more of the first and second aspects, performing DPoD correction on the one or more communications comprises performing DPoD correction with a quantity of iterations that is based at least in part on the one or more communications having precoding that is associated with the PA NL coefficients.

In a fourth additional aspect, alone or in combination with one or more of the first through third aspects, obtaining the PA NL coefficients comprises performing DPoD correction on the one or more signals, wherein the PA NL coefficients are PA NL coefficients identified in connection with the DPoD correction.

In a fifth additional aspect, alone or in combination with one or more of the first through fourth aspects, transmitting the indication of the PA NL coefficients is in association with one or more of establishing a connection with a network node associated with transmission of the one or more communications, receiving a request for the PA NL coefficients, detecting a change in one or more of a beam, an antenna panel, or a power amplifier associated with the one or more communications, or a time-based trigger.

In a sixth additional aspect, alone or in combination with one or more of the first through fifth aspects, the PA NL coefficients are associated with precoding for additional communications with additional UEs.

In a seventh additional aspect, alone or in combination with one or more of the first through sixth aspects, the precoding is associated with data included in the one or more communications.

In an eighth additional aspect, alone or in combination with one or more of the first through seventh aspects, the one or more signals are within a time slot group, and wherein a number of time units included within the time slot group is associated with one or more of a communication protocol, an indication from the network node, or an indication from an additional network node.

Although FIG. 6 shows example blocks of process 600, in some aspects, process 600 may include additional blocks, fewer blocks, different blocks, or differently arranged blocks than those depicted in FIG. 6. Additionally or alternatively, two or more of the blocks of process 600 may be performed in parallel.

Figure 7:
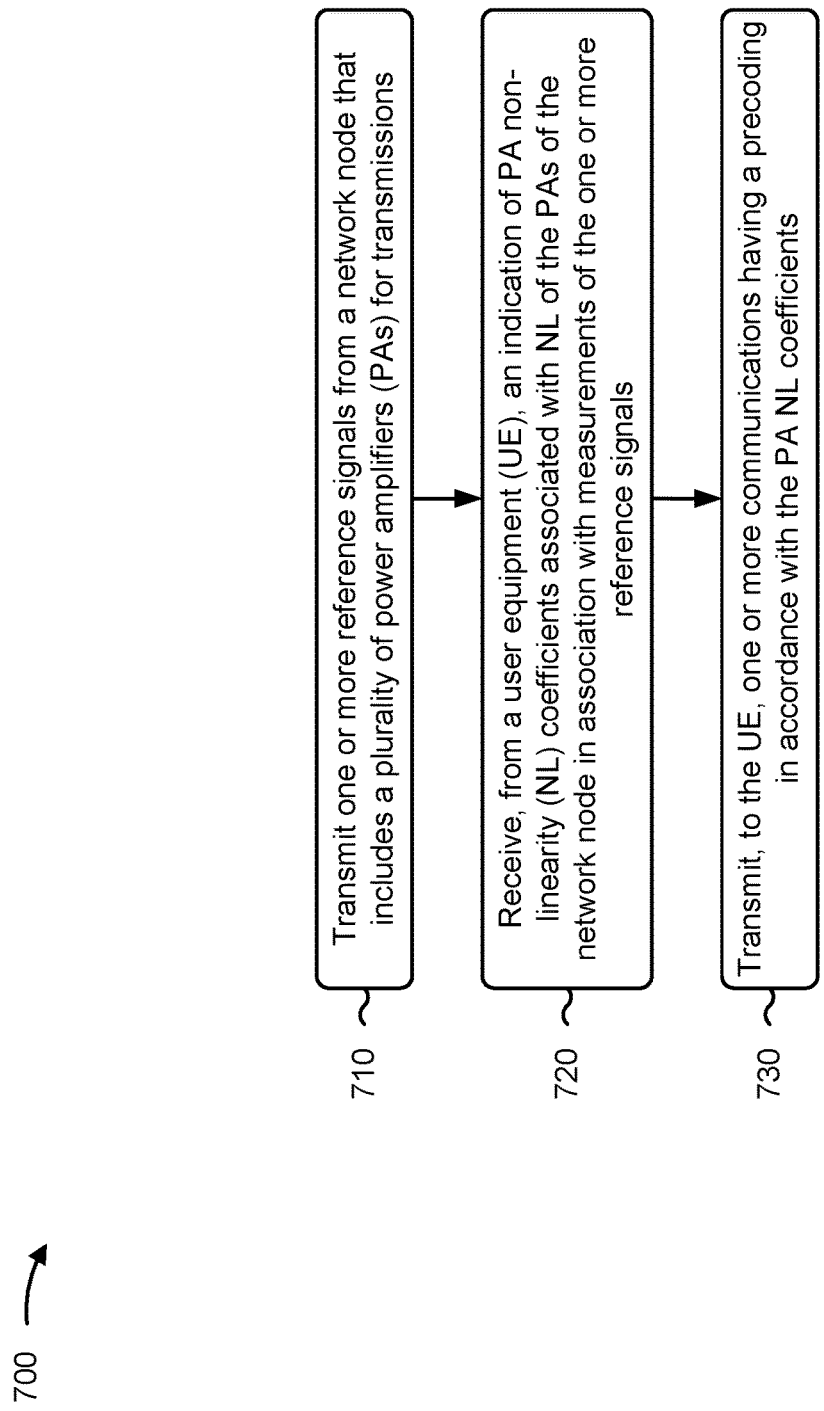
FIG. 7 is a diagram illustrating an example process performed, for example, by a network node, that supports communicating using NL distortion in accordance with the present disclosure.

FIG. 7 is a flowchart illustrating an example process 700 performed, for example, by a network node that supports precoding for NL correction in accordance with the present disclosure. Example process 700 is an example where the network node (for example, network node 110) performs operations associated with precoding for NL correction.

As shown in FIG. 7, in some aspects, process 700 may include transmitting one or more reference signals from a network node that includes a plurality of PAs for transmissions (block 710). For example, the network node (such as by using communication manager 150 or transmission component 902, depicted in FIG. 9) may transmit one or more reference signals from a network node that includes a plurality of PAs for transmissions, as described above.

As further shown in FIG. 7, in some aspects, process 700 may include receiving, from a UE, an indication of PA NL coefficients associated with NL of the PAs of the network node in association with measurements of the one or more reference signals (block 720). For example, the network node (such as by using communication manager 150 or reception component 902, depicted in FIG. 9) may receive, from a UE, an indication of PA NL coefficients associated with NL of the PAs of the network node in association with measurements of the one or more reference signals, as described above.

As further shown in FIG. 7, in some aspects, process 700 may include transmitting, to the UE, one or more communications having a precoding in accordance with the PA NL coefficients (block 730). For example, the network node (such as by using communication manager 150 or transmission component 904, depicted in FIG. 9) may transmit, to the UE, one or more communications having a precoding in accordance with the PA NL coefficients, as described above.

Process 700 may include additional aspects, such as any single aspect or any combination of aspects described below or in connection with one or more other processes described elsewhere herein.

In a first additional aspect, the PA NL coefficients are associated with precoding for communications with multiple UEs.

In a second additional aspect, alone or in combination with the first aspect, obtaining the PA NL coefficients comprises receiving an indication of the PA NL coefficients from a proper subset of the multiple UEs.

In a third additional aspect, alone or in combination with one or more of the first and second aspects, the multiple UEs are associated with a single transmission beam of the network node or a proper subset of transmission beams of the network node.

In a fourth additional aspect, alone or in combination with one or more of the first through third aspects, obtaining the PA NL coefficients comprises one or more of measuring the PA NL coefficients based at least in part on performance of digital pre-distortion (DPD) correction, or receiving an indication of the PA NL coefficients based at least in part on performance of DPoD correction.

In a fifth additional aspect, alone or in combination with one or more of the first through fourth aspects, receiving the indication of the PA NL coefficients is in association with one or more of establishing a connection with a UE associated with reception of the one or more communications, transmitting a request for the PA NL coefficients, detecting a change in one or more of a beam, an antenna panel, or a power amplifier associated with the one or more communications, or a time-based trigger.

In a sixth additional aspect, alone or in combination with one or more of the first through fifth aspects, the performance of DPoD correction is associated with one or more signals within a time slot group, and wherein a number of time units included within the time slot group is associated with one or more of a communication protocol, an indication from the network node, or an indication from an additional network node.

In a seventh additional aspect, alone or in combination with one or more of the first through sixth aspects, the precoding is associated with improving a signal strength associated with a time resource having a minimum signal strength of a set of time resources associated with one or more transmitted signals.

In an eighth additional aspect, alone or in combination with one or more of the first through seventh aspects, the precoding is associated with data included in the one or more communications.

Although FIG. 7 shows example blocks of process 700, in some aspects, process 700 may include additional blocks, fewer blocks, different blocks, or differently arranged blocks than those depicted in FIG. 7. Additionally or alternatively, two or more of the blocks of process 700 may be performed in parallel.

The foregoing disclosure provides illustration and description but is not intended to be exhaustive or to limit the aspects to the precise forms disclosed. Modifications and variations may be made in light of the above disclosure or may be acquired from practice of the aspects.

Figure 8:
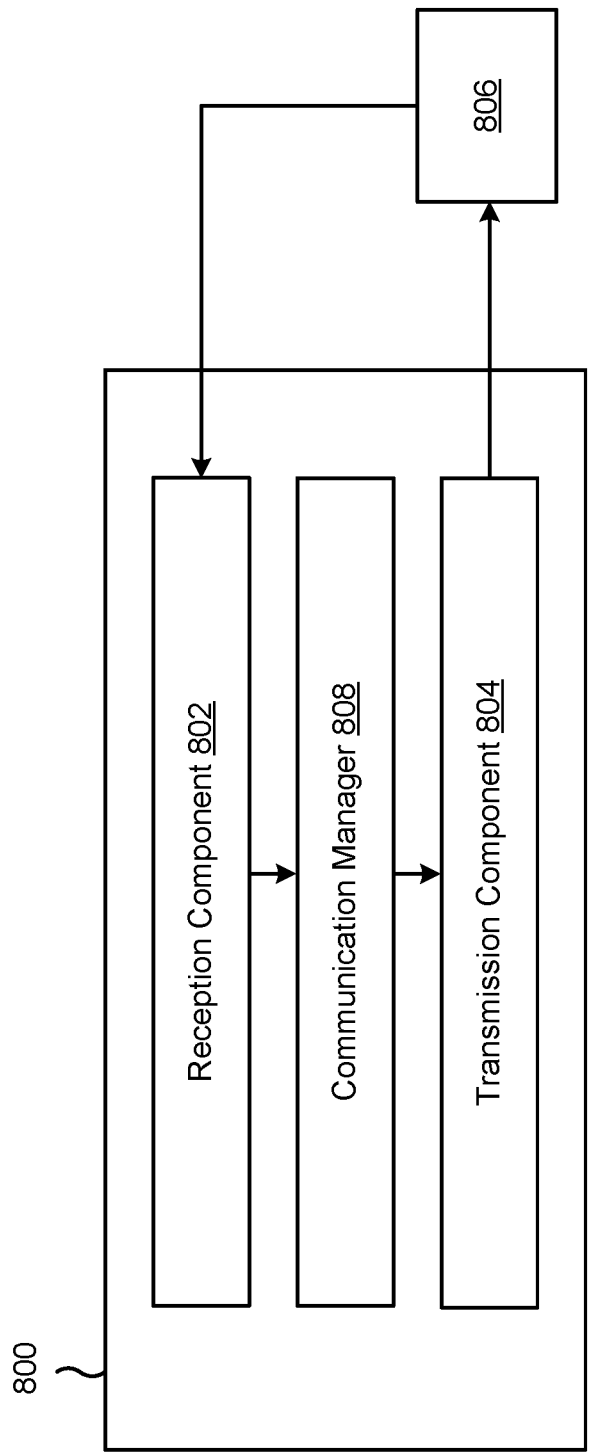
FIG. 8 is a diagram of an example apparatus for wireless communication that supports communicating using NL distortion in accordance with the present disclosure.

FIG. 8 is a diagram of an example apparatus 800 for wireless communication that supports precoding for NL correction in accordance with the present disclosure. The apparatus 800 may be a UE, or a UE may include the apparatus 800. In some aspects, the apparatus 800 includes a reception component 802, a transmission component 804, and a communication manager 808 (for example, communication manager 140), which may be in communication with one another (for example, via one or more buses). As shown, the apparatus 800 may communicate with another apparatus 806 (such as a UE, a network node, or another wireless communication device) using the reception component 802 and the transmission component 804.

In some aspects, the apparatus 800 may be configured to and/or operable to perform one or more operations described herein in connection with FIG. 5. Additionally or alternatively, the apparatus 800 may be configured to and/or operable to perform one or more processes described herein, such as process 600 of FIG. 6. In some aspects, the apparatus 800 may include one or more components of the UE described above in connection with FIG. 2.

The reception component 802 may receive communications, such as reference signals, control information, and/or data communications, from the apparatus 806. The reception component 802 may provide received communications to one or more other components of the apparatus 800, such as the communication manager 808. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 802 may include one or more antennas, a modem, a demodulator, a MIMO detector, a receive processor, a controller/processor, and/or a memory of the UE described above in connection with FIG. 2.

The transmission component 804 may transmit communications, such as reference signals, control information, and/or data communications, to the apparatus 806. In some aspects, the communication manager 808 may generate communications and may transmit the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, and/or a memory of the UE described above in connection with FIG. 2. In some aspects, the transmission component 804 may be co-located with the reception component 802 in a transceiver.

The communication manager 808 may receive or may cause the reception component 802 to receive one or more reference signals from a network node that includes a plurality of PAs for transmissions. The communication manager 808 may transmit or may cause the transmission component 804 to transmit, to the network node, an indication of PA NL coefficients associated with NL of the PAs of the network node in association with measurements of the one or more reference signals. The communication manager 808 may receive or may cause the reception component 802 to receive, from the network node, one or more communications having a precoding in accordance with the PA NL coefficients. In some aspects, the communication manager 808 may perform one or more operations described elsewhere herein as being performed by one or more components of the communication manager 808.

The communication manager 140 may include a controller/processor or a memory of the UE described above in connection with FIG. 2. Alternatively, the set of components may be separate and distinct from the communication manager 140. In some aspects, one or more components of the set of components may include or may be implemented within a controller/processor or a memory of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive one or more reference signals from a network node that includes a plurality of PAs for transmissions. The transmission component 804 may transmit, to the network node, an indication of PA NL coefficients associated with NL of the PAs of the network node in association with measurements of the one or more reference signals. The reception component 802 may receive, from the network node, one or more communications having a precoding in accordance with the PA NL coefficients.

The communication manager 808 or reception component 802 may perform DPoD correction on the one or more communications.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
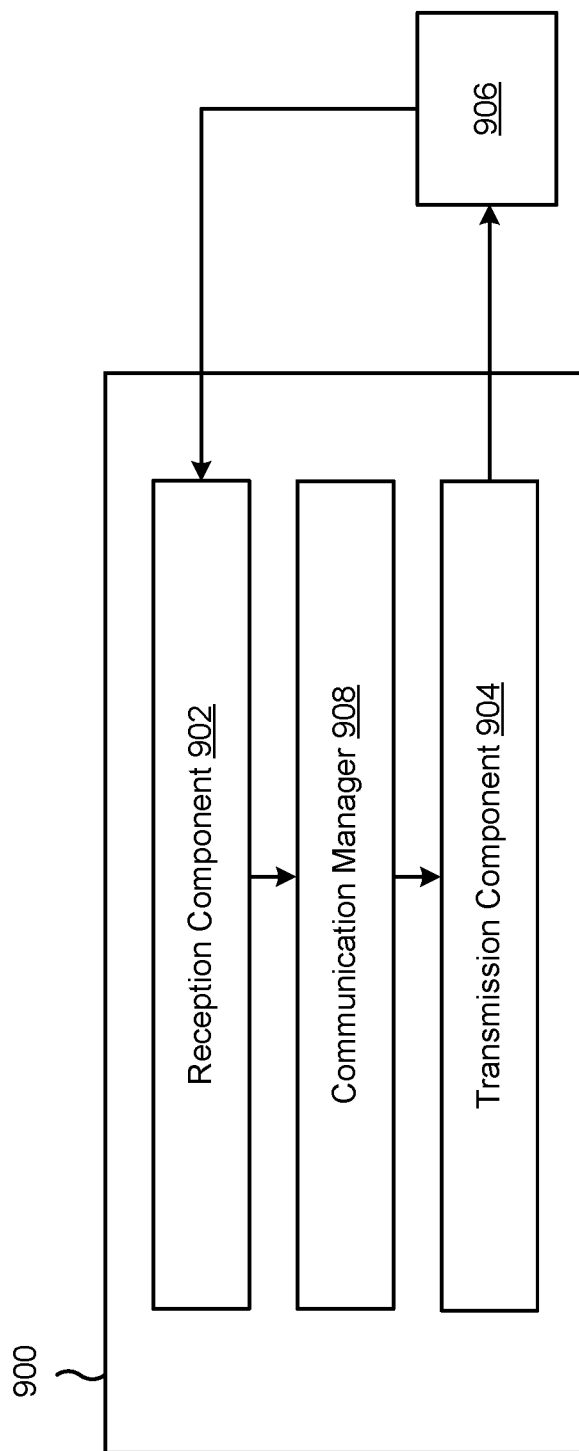
FIG. 9 is a diagram of an example apparatus for wireless communication that supports communicating using NL distortion in accordance with the present disclosure.

FIG. 9 is a diagram of an example apparatus 900 for wireless communication that supports precoding for NL correction in accordance with the present disclosure. The apparatus 900 may be a network node, or a network node may include the apparatus 900. In some aspects, the apparatus 900 includes a reception component 902, a transmission component 904, and a communication manager 908 (for example, communication manager 150), which may be in communication with one another (for example, via one or more buses). As shown, the apparatus 900 may communicate with another apparatus 906 (such as a UE, a network node, or another wireless communication device) using the reception component 902 and the transmission component 904.

In some aspects, the apparatus 900 may be configured to and/or operable to perform one or more operations described herein in connection with FIG. 5. Additionally or alternatively, the apparatus 900 may be configured to and/or operable to perform one or more processes described herein, such as process 700 of FIG. 7. In some aspects, the apparatus 900 may include one or more components of the network node described above in connection with FIG. 2.

The reception component 902 may receive communications, such as reference signals, control information, and/or data communications, from the apparatus 906. The reception component 902 may provide received communications to one or more other components of the apparatus 900, such as the communication manager 908. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 902 may include one or more antennas, a modem, a demodulator, a MIMO detector, a receive processor, a controller/processor, and/or a memory of the network node described above in connection with FIG. 2.

The transmission component 904 may transmit communications, such as reference signals, control information, and/or data communications, to the apparatus 906. In some aspects, the communication manager 908 may generate communications and may transmit the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, and/or a memory of the network node described above in connection with FIG. 2. In some aspects, the transmission component 904 may be co-located with the reception component 902 in a transceiver.

The communication manager 908 may transmit or may cause the transmission component 904 to transmit one or more reference signals from a network node that includes a plurality of PAs for transmissions. The communication manager 908 may receive or may cause the reception component 902 to receive, from a UE, an indication of PA NL coefficients associated with NL of the PAs of the network node in association with measurements of the one or more reference signals. The communication manager 908 may transmit or may cause the transmission component 904 to transmit, to the UE, one or more communications having a precoding in accordance with the PA NL coefficients. In some aspects, the communication manager 908 may perform one or more operations described elsewhere herein as being performed by one or more components of the communication manager 908.

The communication manager 150 may include a controller/processor, a memory, a scheduler, and/or a communication unit of the network node described above in connection with FIG. 2. Alternatively, the set of components may be separate and distinct from the communication manager 150. In some aspects, one or more components of the set of components may include or may be implemented within a controller/processor, a memory, a scheduler, and/or a communication unit of the network node described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission component 904 may transmit one or more reference signals from a network node that includes a plurality of PAs for transmissions. The reception component 902 may receive, from a UE, an indication of PA NL coefficients associated with NL of the PAs of the network node in association with measurements of the one or more reference signals. The transmission component 904 may transmit, to the UE, one or more communications having a precoding in accordance with the PA NL coefficients.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: receiving one or more reference signals from a network node that includes a plurality of power amplifiers (PAs) for transmissions; transmitting, to the network node, an indication of PA non-linearity (NL) coefficients associated with NL of the PAs of the network node in association with measurements of the one or more reference signals; and receiving, from the network node, one or more communications having a precoding in accordance with the PA NL coefficients.

Aspect 2: The method of Aspect 1, wherein the precoding is associated with improving a signal strength associated with a time resource having a minimum signal strength of a set of time resources associated with the one or more signals.

Aspect 3: The method of any of Aspects 1-2, further comprising: performing digital post-distortion (DPoD) correction on the one or more communications.

Aspect 4: The method of Aspect 3, wherein performing DPoD correction on the one or more communications comprises: performing DPoD correction with a quantity of iterations that is based at least in part on the one or more communications having precoding that is associated with the PA NL coefficients.

Aspect 5: The method of any of Aspects 1-4, wherein obtaining the PA NL coefficients comprises performing digital post-distortion (DPoD) correction on the one or more signals, wherein the PA NL coefficients are PA NL coefficients identified in connection with the DPoD correction.

Aspect 6: The method of any of Aspects 1-5, wherein transmitting the indication of the PA NL coefficients is in association with one or more of: establishing a connection with a network node associated with transmission of the one or more communications, receiving a request for the PA NL coefficients, detecting a change in one or more of a beam, an antenna panel, or a power amplifier associated with the one or more communications, or a time-based trigger.

Aspect 7: The method of any of Aspects 1-6, wherein the PA NL coefficients are associated with precoding for additional communications with additional UEs.

Aspect 8: The method of any of Aspects 1-7, wherein the precoding is associated with data included in the one or more communications.

Aspect 9: The method of any of Aspects 1-8, wherein the one or more signals are within a time slot group, and wherein a number of time units included within the time slot group is associated with one or more of a communication protocol, an indication from the network node, or an indication from an additional network node.

Aspect 10: A method of wireless communication performed by a network node, comprising: transmitting one or more reference signals from a network node that includes a plurality of power amplifiers (PAs) for transmissions; receiving, from a user equipment (UE), an indication of PA non-linearity (NL) coefficients associated with NL of the PAs of the network node in association with measurements of the one or more reference signals; and transmitting, to the UE, one or more communications having a precoding in accordance with the PA NL coefficients.

Aspect 11: The method of Aspect 10, wherein the PA NL coefficients are associated with precoding for communications with multiple UEs.

Aspect 12: The method of Aspect 11, wherein obtaining the PA NL coefficients comprises receiving an indication of the PA NL coefficients from a proper subset of the multiple UEs.

Aspect 13: The method of Aspect 11, wherein the multiple UEs are associated with a single transmission beam of the network node or a proper subset of transmission beams of the network node.

Aspect 14: The method of any of Aspects 10-13, wherein obtaining the PA NL coefficients comprises one or more of: measuring the PA NL coefficients based at least in part on performance of digital pre-distortion (DPD) correction; or receiving an indication of the PA NL coefficients based at least in part on performance, by a receiving device, of digital post-distortion (DPoD) correction.

Aspect 15: The method of Aspect 14, wherein receiving the indication of the PA NL coefficients is in association with one or more of: establishing a connection with a user equipment (UE) associated with reception of the one or more communications, transmitting a request for the PA NL coefficients, detecting a change in one or more of a beam, an antenna panel, or a power amplifier associated with the one or more communications, or a time-based trigger.

Aspect 16: The method of Aspect 14, wherein the performance of DPoD correction is associated with one or more signals within a time slot group, and wherein a number of time units included within the time slot group is associated with one or more of a communication protocol, an indication from the network node, or an indication from an additional network node.

Aspect 17: The method of any of Aspects 10-16, wherein the precoding is associated with improving a signal strength associated with a time resource having a minimum signal strength of a set of time resources associated with one or more transmitted signals.

Aspect 18: The method of any of Aspects 10-17, wherein the precoding is associated with data included in the one or more communications.

Aspect 19: An apparatus for wireless communication at a device, comprising a processor; memory coupled with the processor; and instructions stored in the memory and executable by the processor to cause the apparatus to perform the method of one or more of Aspects 1-18.

Aspect 20: A device for wireless communication, comprising a memory and one or more processors coupled to the memory, the one or more processors configured to perform the method of one or more of Aspects 1-18.

Aspect 21: An apparatus for wireless communication, comprising at least one means for performing the method of one or more of Aspects 1-18.

Aspect 22: A non-transitory computer-readable medium storing code for wireless communication, the code comprising instructions executable by a processor to perform the method of one or more of Aspects 1-18.

Aspect 23: A non-transitory computer-readable medium storing a set of instructions for wireless communication, the set of instructions comprising one or more instructions that, when executed by one or more processors of a device, cause the device to perform the method of one or more of Aspects 1-18.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of": a, b, or c is intended to cover a, b, c, a+b, a+c, b+c, and a+b+c, as well as any combination with multiples of the same element (for example, a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (for example, an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (for example, if used in combination with "either" or "only one of").

What is claimed is:

1. A user equipment (UE) for wireless communication, comprising:
   one or more memories storing processor-readable code; and
   one or more processors coupled with the one or more memories and operable to cause the UE to:
   receive one or more reference signals from a network node that includes a plurality of power amplifiers (PAS) for transmissions;
   transmit, to the network node, an indication of PA non-linearity (NL) coefficients associated with NL of the plurality of PAs of the network node in association with measurements of the one or more reference signals; and
   receive, from the network node, one or more communications having a precoding in accordance with the indication of the PA NL coefficients, wherein the precoding is associated with data included in the one or more communications.

2. The UE of claim 1, wherein the precoding is associated with improving a signal strength associated with a time resource having a minimum signal strength of a set of time resources associated with the one or more signals.

3. The UE of claim 1, wherein the one or more processors are further operable to cause the UE to:
   perform digital post-distortion (DPOD) correction on the one or more communications.

4. The UE of claim 3, wherein, to cause the UE to perform DPOD correction on the one or more communications, the one or more processors are operable to cause the UE to:
   perform DPOD correction with a quantity of iterations that is based at least in part on the one or more communications having precoding that is associated with the indication of the PA NL coefficients.

5. The UE of claim 1, wherein the one or more processors are operable to cause the UE to obtain the PA NL coefficients, wherein, to cause the UE to obtain the PA NL coefficients, the one or more processors are operable to cause the UE to perform digital post-distortion (DPOD) correction on the one or more signals,
   wherein the PA NL coefficients are identified in connection with the DPOD correction.

6. The UE of claim 1, wherein the transmission of the indication of the PA NL coefficients is in association with one or more of:
   establish a connection with a network node associated with transmission of the one or more communications,
   receive a request for the PA NL coefficients,
   detect a change in one or more of a beam, an antenna panel, or a power amplifier associated with the one or more communications, or
   a time-based trigger.

7. The UE of claim 1, wherein the PA NL coefficients are associated with precoding for additional communications with additional UEs.

8. The UE of claim 1, wherein the one or more signals are within a time slot group, and
   wherein a number of time units included within the time slot group is associated with one or more of a communication protocol, an indication from the network node, or an indication from an additional network node.

9. A network node for wireless communication, comprising:
   one or more memories storing processor-readable code; and
   one or more processors coupled with the one or more memories and operable to cause the network node to:
   transmit one or more reference signals from a network node that includes a plurality of power amplifiers (PAs) for transmissions;
   receive, from a user equipment (UE), an indication of PA non-linearity (NL) coefficients associated with NL of the plurality of PAs of the network node in association with measurements of the one or more reference signals; and
   transmit, to the UE, one or more communications having a precoding in accordance with the indication of the PA NL coefficients, wherein the precoding is associated with data included in the one or more communications.

10. The network node of claim 9, wherein the PA NL coefficients are associated with precoding for communications with multiple UEs.

11. The network node of claim 10, wherein, to cause the network node to receive the indication of the PA NL coefficients, the one or more processors are operable to cause the network node to receive the indication of the PA NL coefficients from a proper subset of the multiple UEs.

12. The network node of claim 10, wherein the multiple UEs are associated with a single transmission beam of the network node or a proper subset of transmission beams of the network node.

13. The network node of claim 9, wherein, to cause the network node to receive the indication of the PA NL coefficients, the one or more processors are operable to cause the network node to:
  measure the PA NL coefficients based at least in part on performance of digital pre-distortion (DPD) correction; or
  receive the indication of the PA NL coefficients based at least in part on performance of digital post-distortion (DPOD) correction.

14. The network node of claim 13, wherein the reception of the indication of the PA NL coefficients is in association with one or more of:
  establish a connection with a user equipment (UE) associated with reception of the one or more communications,
  transmit a request for the PA NL coefficients,
  detect a change in one or more of a beam, an antenna panel, or a power amplifier associated with the one or more communications, or
  a time-based trigger.

15. The network node of claim 13, wherein the performance of DPOD correction is associated with one or more signals within a time slot group, and
  wherein a number of time units included within the time slot group is associated with one or more of a communication protocol, an indication from the network node, or an indication from an additional network node.

16. The network node of claim 9, wherein the precoding is associated with improving a signal strength associated with a time resource having a minimum signal strength of a set of time resources associated with one or more transmitted signals.

17. A method of wireless communication performed by a user equipment (UE), comprising:
  receiving one or more reference signals from a network node that includes a plurality of power amplifiers (PAs) for transmissions;
  transmitting, to the network node, an indication of PA non-linearity (NL) coefficients associated with NL of the plurality of PAs of the network node in association with measurements of the one or more reference signals; and
  receiving, from the network node, one or more communications having a precoding in accordance with the indication of the PA NL coefficients, wherein the precoding is associated with data included in the one or more communications.

18. The method of claim 17, wherein the precoding is associated with improving a signal strength associated with a time resource having a minimum signal strength of a set of time resources associated with the one or more signals.

19. The method of claim 17, further comprising:
  performing digital post-distortion (DPOD) correction on the one or more communications.

20. The method of claim 19, wherein performing DPOD correction on the one or more communications comprises:
  performing DPOD correction with a quantity of iterations that is based at least in part on the one or more communications having precoding that is associated with the indication of the PA NL coefficients.

21. The method of claim 17, further comprising obtaining the PA NL coefficients, wherein obtaining the PA NL coefficients comprises performing digital post-distortion (DPOD) correction on the one or more signals,
  wherein the PA NL coefficients are identified in connection with the DPOD correction.

22. The method of claim 17, wherein transmitting the indication of the PA NL coefficients is in association with one or more of:
  establishing a connection with a network node associated with transmission of the one or more communications,
  receiving a request for the PA NL coefficients,
  detecting a change in one or more of a beam, an antenna panel, or a power amplifier associated with the one or more communications, or
  a time-based trigger.

23. The method of claim 17, wherein the one or more signals are within a time slot group, and
  wherein a number of time units included within the time slot group is associated with one or more of a communication protocol, an indication from the network node, or an indication from an additional network node.

24. A method of wireless communication performed by a network node, comprising:
  transmitting one or more reference signals from a network node that includes a plurality of power amplifiers (PAs) for transmissions;
  receiving, from a user equipment (UE), an indication of PA non-linearity (NL) coefficients associated with NL of the plurality of PAs of the network node in association with measurements of the one or more reference signals; and
  transmitting, to the UE, one or more communications having a precoding in accordance with the PA NL coefficients, wherein the precoding is associated with data included in the one or more communications.

25. The method of claim 24, wherein the PA NL coefficients are associated with precoding for communications with multiple UEs.

26. The method of claim 25, wherein receiving the indication of the PA NL coefficients comprises receiving the indication of the PA NL coefficients from a proper subset of the multiple UEs.

27. The method of claim 25, wherein the multiple UEs are associated with a single transmission beam of the network node or a proper subset of transmission beams of the network node.

28. The method of claim 24, wherein receiving the PA NL coefficients comprises one or more of:
  measuring the PA NL coefficients based at least in part on performance of digital pre-distortion (DPD) correction; or
  receiving an indication of the PA NL coefficients based at least in part on performance, by a receiving device, of digital post-distortion (DPOD) correction.

29. The method of claim 26, wherein receiving the indication of the PA NL coefficients is in association with one or more of:
  establishing a connection with a user equipment (UE) associated with reception of the one or more communications,
  transmitting a request for the PA NL coefficients,
  detecting a change in one or more of a beam, an antenna panel, or a power amplifier associated with the one or more communications, or
  a time-based trigger.

30. The method of claim 24, wherein the performance of DPOD correction is associated with one or more signals within a time slot group, and
  wherein a number of time units included within the time slot group is associated with one or more of a communication protocol, an indication from the network node, or an indication from an additional network node.

* * * * *